(12) United States Patent
Westwood et al.

(10) Patent No.: US 9,168,720 B2
(45) Date of Patent: Oct. 27, 2015

(54) BIAXIALLY ELASTIC NONWOVEN LAMINATES HAVING INELASTIC ZONES

(75) Inventors: Alistair Duncan Westwood, Kingwood, TX (US); William M. Ferry, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 916 days.

(21) Appl. No.: 12/566,434

(22) Filed: Sep. 24, 2009

(65) Prior Publication Data

US 2010/0222761 A1    Sep. 2, 2010

Related U.S. Application Data

(60) Provisional application No. 61/171,135, filed on Apr. 21, 2009, provisional application No. 61/156,078, filed on Feb. 27, 2009.

(51) Int. Cl.
*B29C 65/00* (2006.01)
*B32B 37/00* (2006.01)
(Continued)

(52) U.S. Cl.
CPC ... *B32B 5/26* (2013.01); *B32B 5/12* (2013.01); *B32B 37/144* (2013.01); *D04H 1/498* (2013.01);
(Continued)

(58) Field of Classification Search
CPC ........ B29C 65/00; B29C 65/02; B29C 65/18; B29C 66/41; B29C 66/43; B29C 66/431; B29C 66/1122; B29C 66/71; B29C 66/712; B29C 66/20; B29C 66/21; B32B 5/00; B32B 5/02; B32B 5/022; B32B 5/26; B32B 5/04; B32B 2307/51; B32B 27/02; B32B 27/12; B32B 2555/02; B32B 37/00; B32B 37/144; B32B 2262/0253; D04H 13/007; D04H 3/16; A61F 2013/49036

USPC ............. 156/60, 62.2, 62.4, 73.1, 73.2, 73.4, 156/148, 166, 167, 176, 178, 180, 181, 183, 156/242, 244.11, 290, 308.2, 308.4, 308.9, 156/324; 604/358, 385.01

See application file for complete search history.

(56) References Cited

U.S. PATENT DOCUMENTS 3,149,178 A    9/1964  Hamilton et al.
3,338,992 A    8/1967  Kinney
(Continued)

FOREIGN PATENT DOCUMENTS

CA    1 268 753    5/1990
CN    1279935    1/2001
(Continued)

OTHER PUBLICATIONS

Dharmarajan, N. et al., "*Tailoring the Performance of Specialty Polyolefin Elastomer Based Elastic Nonwoven Fabrics*", INTC® 2006, International Nonwovens Technical Conference, Conference Proceedings, Houston, TX, United States, Sep. 25-28, 2006.
(Continued)

*Primary Examiner* — Philip Tucker
*Assistant Examiner* — Brian R Slawski
(74) *Attorney, Agent, or Firm* — Kevin M. Faulkner

(57) ABSTRACT

Disclosed is a method of imparting constraint in a biaxially elastic nonwoven laminate, and the constrained laminate itself, the method comprising providing a biaxially elastic nonwoven laminate comprising at least one meltspun elastic fabric and at least one extensible fabric or film; and fusing at least, or preferably, only a portion(s) of the at least one meltspun elastic fabric to at least one of the extensible fabrics to create at least one inelastic zone. Desirably, the at least one meltspun elastic fabric and at least one extensible fabric or film is biaxially elastic, and referred to as being "nonwoven" due to the at least one layer of meltspun elastomer. The meltspun elastic fabric may comprise a polyolefin-based elastomer or blend of an elastomer with a thermoplastic.

12 Claims, 2 Drawing Sheets

(51) Int. Cl.

| | | |
|---|---|---|
| C08J 5/00 | (2006.01) | |
| B65C 9/25 | (2006.01) | |
| A61F 13/15 | (2006.01) | |
| A61F 13/20 | (2006.01) | |
| B32B 5/26 | (2006.01) | |
| B32B 5/12 | (2006.01) | |
| B32B 37/14 | (2006.01) | |
| D04H 1/498 | (2012.01) | |
| D04H 3/14 | (2012.01) | |
| B29C 65/18 | (2006.01) | |

(52) U.S. Cl.
CPC *D04H 3/14* (2013.01); *B29C 65/18* (2013.01); *B29C 66/21* (2013.01); *B29C 66/43* (2013.01); *B29C 66/712* (2013.01); *B32B 2037/0092* (2013.01); *B32B 2262/0207* (2013.01); *B32B 2262/0253* (2013.01); *B32B 2262/12* (2013.01); *B32B 2305/20* (2013.01); *B32B 2307/51* (2013.01); *B32B 2432/00* (2013.01); *B32B 2535/00* (2013.01); *B32B 2555/02* (2013.01); *Y10T 428/2481* (2015.01); *Y10T 428/24942* (2015.01); *Y10T 442/10* (2015.04); *Y10T 442/2033* (2015.04); *Y10T 442/3707* (2015.04); *Y10T 442/3789* (2015.04); *Y10T 442/601* (2015.04); *Y10T 442/602* (2015.04); *Y10T 442/659* (2015.04); *Y10T 442/66* (2015.04); *Y10T 442/666* (2015.04); *Y10T 442/668* (2015.04)

(56) References Cited

U.S. PATENT DOCUMENTS

| | | |
|---|---|---|
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,041,203 A | 8/1977 | Brock et al. |
| 4,042,740 A | 8/1977 | Krueger |
| 4,100,324 A | 7/1978 | Anderson et al. |
| 4,103,058 A | 7/1978 | Humlicek |
| 4,105,381 A | 8/1978 | Platt et al. |
| 4,116,892 A | 9/1978 | Schwarz |
| 4,144,008 A | 3/1979 | Schwarz |
| 4,153,751 A | 5/1979 | Schwarz |
| 4,177,312 A | 12/1979 | Rasen et al. |
| 4,209,563 A | 6/1980 | Sisson |
| 4,223,059 A | 9/1980 | Schwarz |
| 4,251,585 A | 2/1981 | Schwarz |
| 4,252,590 A | 2/1981 | Rasen et al. |
| 4,285,100 A | 8/1981 | Schwarz |
| 4,289,832 A | 9/1981 | Schwarz |
| 4,340,563 A | 7/1982 | Appel et al. |
| 4,368,565 A | 1/1983 | Schwarz |
| 4,380,570 A | 4/1983 | Schwarz |
| 4,410,602 A | 10/1983 | Komoda et al. |
| 4,461,872 A | 7/1984 | Su |
| 4,540,753 A | 9/1985 | Cozewith et al. |
| 4,657,802 A | 4/1987 | Morman |
| 4,775,579 A | 10/1988 | Hagy et al. |
| 4,818,464 A | 4/1989 | Lau |
| 4,827,064 A | 5/1989 | Wu |
| 4,827,073 A | 5/1989 | Wu |
| 4,950,720 A | 8/1990 | Randall, Jr. et al. |
| 4,965,122 A | 10/1990 | Morman |
| 4,981,747 A | 1/1991 | Morman |
| 5,017,714 A | 5/1991 | Welborn, Jr. |
| 5,055,438 A | 10/1991 | Canich |
| 5,057,475 A | 10/1991 | Canich et al. |
| 5,078,935 A | 1/1992 | Kobayashi et al. |
| 5,096,867 A | 3/1992 | Canich |
| 5,108,820 A | 4/1992 | Kaneko et al. |
| 5,108,827 A | 4/1992 | Gessner |
| 5,114,787 A | 5/1992 | Chaplin et al. |
| 5,130,076 A | 7/1992 | Blatz et al. |
| 5,143,679 A | 9/1992 | Weber et al. |
| 5,145,727 A | 9/1992 | Potts et al. |
| 5,147,712 A | 9/1992 | Miyahara et al. |
| 5,153,157 A | 10/1992 | Hlatky et al. |
| 5,156,793 A | 10/1992 | Buell et al. |
| 5,167,897 A | 12/1992 | Weber et al. |
| 5,169,706 A | 12/1992 | Collier, IV et al. |
| 5,171,908 A | 12/1992 | Rudnick |
| 5,178,931 A | 1/1993 | Perkins et al. |
| 5,182,162 A | 1/1993 | Andrusko |
| 5,187,005 A | 2/1993 | Stahle et al. |
| 5,188,885 A | 2/1993 | Timmons et al. |
| 5,190,812 A | 3/1993 | Joseph et al. |
| 5,198,401 A | 3/1993 | Turner et al. |
| 5,226,992 A | 7/1993 | Morman |
| 5,227,224 A | 7/1993 | Ishikawa et al. |
| 5,230,949 A | 7/1993 | Howard et al. |
| 5,234,423 A | 8/1993 | Alemany et al. |
| 5,238,733 A | 8/1993 | Joseph et al. |
| 5,240,894 A | 8/1993 | Burkhardt et al. |
| 5,242,436 A | 9/1993 | Weil et al. |
| 5,244,724 A | 9/1993 | Antonacci et al. |
| 5,260,126 A | 11/1993 | Collier, IV et al. |
| 5,264,405 A | 11/1993 | Canich |
| 5,272,003 A | 12/1993 | Peacock |
| 5,288,791 A | 2/1994 | Collier, IV et al. |
| 5,292,389 A | 3/1994 | Tsuji et al. |
| 5,294,482 A | 3/1994 | Gessner |
| 5,306,545 A | 4/1994 | Shirayanagi et al. |
| 5,320,891 A | 6/1994 | Levy et al. |
| 5,324,576 A | 6/1994 | Reed et al. |
| 5,324,580 A | 6/1994 | Allan et al. |
| 5,324,800 A | 6/1994 | Welborn, Jr. et al. |
| 5,330,458 A | 7/1994 | Buell et al. |
| 5,330,829 A | 7/1994 | Miller |
| 5,332,613 A | 7/1994 | Taylor et al. |
| 5,334,636 A | 8/1994 | Fujii et al. |
| 5,336,457 A | 8/1994 | Wu et al. |
| 5,336,545 A | 8/1994 | Morman |
| 5,346,756 A | 9/1994 | Ogale et al. |
| 5,349,016 A | 9/1994 | DeNicola, Jr. et al. |
| 5,358,500 A | 10/1994 | Lavon et al. |
| 5,366,782 A | 11/1994 | Curro et al. |
| 5,366,786 A | 11/1994 | Connor et al. |
| 5,366,793 A | 11/1994 | Fitts, Jr. et al. |
| 5,368,584 A | 11/1994 | Clear et al. |
| 5,368,919 A | 11/1994 | Robeson |
| 5,368,927 A | 11/1994 | Lesca et al. |
| 5,372,885 A | 12/1994 | Tabor et al. |
| 5,382,400 A | 1/1995 | Pike et al. |
| 5,382,461 A | 1/1995 | Wu |
| 5,385,775 A | 1/1995 | Wright |
| 5,393,599 A | 2/1995 | Quantrille et al. |
| 5,418,045 A | 5/1995 | Pike et al. |
| 5,422,172 A | 6/1995 | Wu |
| 5,425,987 A | 6/1995 | Shawver et al. |
| 5,455,110 A | 10/1995 | Connor |
| 5,464,401 A | 11/1995 | Hasse et al. |
| 5,466,411 A | 11/1995 | Butterfass et al. |
| 5,472,775 A | 12/1995 | Obijeski et al. |
| 5,476,616 A | 12/1995 | Schwarz |
| 5,482,765 A | 1/1996 | Bradley et al. |
| 5,482,772 A | 1/1996 | Strack et al. |
| 5,492,753 A | 2/1996 | Levy et al. |
| 5,496,298 A | 3/1996 | Kuepper et al. |
| 5,507,736 A | 4/1996 | Clear et al. |
| 5,523,141 A | 6/1996 | Fyler |
| 5,534,339 A | 7/1996 | Stokes |
| 5,534,340 A | 7/1996 | Gupta et al. |
| 5,536,563 A | 7/1996 | Shah et al. |
| 5,540,976 A | 7/1996 | Shawver et al. |
| 5,549,964 A | 8/1996 | Shohji et al. |
| 5,556,392 A | 9/1996 | Koczab |
| 5,573,841 A | 11/1996 | Adam et al. |
| 5,575,783 A | 11/1996 | Clear et al. |

(56) References Cited

U.S. PATENT DOCUMENTS

| | | | |
|---|---|---|---|
| 5,591,152 A | 1/1997 | Buell et al. |
| 5,593,768 A | 1/1997 | Gessner |
| 5,607,798 A | 3/1997 | Kobylivker et al. |
| 5,616,408 A | 4/1997 | Oleszczuk et al. |
| 5,620,785 A | 4/1997 | Watt et al. |
| 5,628,741 A | 5/1997 | Buell et al. |
| 5,635,290 A | 6/1997 | Stopper et al. |
| 5,641,445 A | 6/1997 | Fauble et al. |
| 5,643,662 A | 7/1997 | Yeo et al. |
| 5,645,542 A | 7/1997 | Anjur et al. |
| 5,645,933 A | 7/1997 | Sakazume et al. |
| 5,652,051 A | 7/1997 | Shawver et al. |
| 5,653,704 A | 8/1997 | Buell et al. |
| 5,672,415 A | 9/1997 | Sawyer et al. |
| 5,674,216 A | 10/1997 | Buell et al. |
| 5,681,646 A | 10/1997 | Ofosu et al. |
| 5,688,157 A | 11/1997 | Bradley et al. |
| 5,690,627 A | 11/1997 | Clear et al. |
| 5,695,849 A | 12/1997 | Shawver et al. |
| 5,695,868 A | 12/1997 | McCormack |
| 5,698,480 A | 12/1997 | Geiman et al. |
| 5,720,832 A | 2/1998 | Minto et al. |
| 5,723,217 A | 3/1998 | Stahl et al. |
| 5,733,822 A | 3/1998 | Gessner et al. |
| 5,783,531 A | 7/1998 | Andrew et al. |
| 5,804,286 A | 9/1998 | Quantrille et al. |
| 5,817,403 A | 10/1998 | Gillyns et al. |
| 5,824,613 A | 10/1998 | Geiman et al. |
| 5,840,412 A | 11/1998 | Wood et al. |
| 5,843,057 A | 12/1998 | McCormack |
| 5,843,068 A | 12/1998 | Allen et al. |
| 5,861,202 A | 1/1999 | Kimura et al. |
| 5,866,488 A | 2/1999 | Terada et al. |
| 5,874,160 A | 2/1999 | Keck |
| 5,880,241 A | 3/1999 | Brookhart et al. |
| 5,883,028 A | 3/1999 | Morman et al. |
| 5,906,879 A | 5/1999 | Huntoon et al. |
| 5,910,362 A | 6/1999 | Aratake et al. |
| 5,914,084 A | 6/1999 | Benson et al. |
| 5,914,184 A | 6/1999 | Morman |
| 5,916,207 A | 6/1999 | Toyoda et al. |
| 5,921,973 A | 7/1999 | Newkirk et al. |
| 5,928,740 A | 7/1999 | Wilhoit et al. |
| 5,942,451 A | 8/1999 | Daponte et al. |
| 5,945,215 A | 8/1999 | Bersted et al. |
| 5,952,252 A | 9/1999 | Shawver et al. |
| 5,985,193 A | 11/1999 | Harrington et al. |
| 5,993,714 A | 11/1999 | Sawyer et al. |
| 5,994,244 A | 11/1999 | Fujiwara et al. |
| 6,015,605 A | 1/2000 | Tsujiyama et al. |
| 6,015,617 A | 1/2000 | Maugans et al. |
| 6,015,764 A | 1/2000 | McCormack et al. |
| 6,028,240 A | 2/2000 | Wessel et al. |
| 6,037,281 A | 3/2000 | Mathis et al. |
| 6,045,898 A | 4/2000 | Kishi et al. |
| 6,071,451 A | 6/2000 | Wang et al. |
| 6,075,179 A | 6/2000 | McCormack et al. |
| 6,080,818 A | 6/2000 | Thakker et al. |
| 6,083,583 A | 7/2000 | Klocek et al. |
| 6,090,472 A | 7/2000 | Wang et al. |
| 6,090,730 A | 7/2000 | Fujiwara et al. |
| 6,096,668 A | 8/2000 | Abuto et al. |
| 6,103,647 A | 8/2000 | Shultz et al. |
| 6,114,261 A | 9/2000 | Strelow et al. |
| 6,114,263 A | 9/2000 | Benson et al. |
| 6,117,546 A | 9/2000 | Geiman et al. |
| 6,140,551 A | 10/2000 | Niemeyer et al. |
| 6,207,237 B1 | 3/2001 | Haffner |
| 6,207,601 B1 | 3/2001 | Maurer et al. |
| 6,207,602 B1 | 3/2001 | Gessner et al. |
| 6,224,977 B1 | 5/2001 | Kobylivker et al. |
| 6,261,674 B1 | 7/2001 | Branham et al. |
| 6,268,203 B1 | 7/2001 | Johnson et al. |
| 6,268,302 B1 | 7/2001 | Ofosu et al. |
| 6,281,289 B1 | 8/2001 | Maugans et al. |
| 6,286,145 B1 | 9/2001 | Welchel et al. |
| 6,312,641 B1 | 11/2001 | Hutchinson |
| 6,323,389 B1 | 11/2001 | Thomas et al. |
| 6,342,565 B1 | 1/2002 | Cheng et al. |
| 6,352,426 B1 | 3/2002 | Hutchinson et al. |
| 6,355,348 B1 | 3/2002 | Takesue et al. |
| 6,362,389 B1 | 3/2002 | McDowall et al. |
| 6,372,172 B1 | 4/2002 | Sudduth et al. |
| 6,391,408 B1 | 5/2002 | Hutchinson |
| 6,410,465 B1 | 6/2002 | Lim et al. |
| 6,417,121 B1 | 7/2002 | Newkirk et al. |
| 6,417,122 B1 | 7/2002 | Newkirk et al. |
| 6,420,285 B1 | 7/2002 | Newkirk et al. |
| 6,443,940 B1 | 9/2002 | Ashton et al. |
| 6,444,774 B1 | 9/2002 | Stahl et al. |
| 6,458,726 B1 | 10/2002 | Harrington et al. |
| 6,465,073 B1 | 10/2002 | Morman et al. |
| 6,465,378 B2 | 10/2002 | Gessner et al. |
| 6,476,289 B1 | 11/2002 | Buell et al. |
| 6,478,785 B1 | 11/2002 | Ashton et al. |
| 6,482,896 B2 | 11/2002 | Maugans et al. |
| 6,503,853 B1 | 1/2003 | Kassner et al. |
| 6,506,695 B2 | 1/2003 | Gardner et al. |
| 6,506,698 B1 | 1/2003 | Quantrille et al. |
| 6,516,472 B2 | 2/2003 | Gessner et al. |
| 6,525,157 B2 | 2/2003 | Cozewith et al. |
| 6,559,262 B1 | 5/2003 | Waymouth et al. |
| 6,569,945 B2 | 5/2003 | Bugada et al. |
| 6,572,598 B1 | 6/2003 | Ashton et al. |
| 6,579,274 B1 | 6/2003 | Morman et al. |
| 6,582,414 B1 | 6/2003 | Richardson |
| 6,586,354 B1 | 7/2003 | Topolkaraev et al. |
| 6,589,892 B1 | 7/2003 | Smith et al. |
| 6,610,039 B1 | 8/2003 | Wilhelm et al. |
| 6,627,564 B1 | 9/2003 | Morman et al. |
| 6,632,212 B1 | 10/2003 | Morman et al. |
| 6,649,546 B2 | 11/2003 | Ohata |
| 6,649,547 B1 | 11/2003 | Arnold et al. |
| 6,676,883 B2 | 1/2004 | Hutchinson et al. |
| 6,706,135 B2* | 3/2004 | Taylor et al. .................. 156/267 |
| 6,717,028 B1 | 4/2004 | Oberstadt |
| 6,777,082 B2 | 8/2004 | Patel et al. |
| 6,780,272 B2 | 8/2004 | Wood |
| 6,881,793 B2 | 4/2005 | Sheldon et al. |
| 6,881,800 B2 | 4/2005 | Friedersdorf |
| 6,887,941 B2 | 5/2005 | Zhou |
| 6,902,796 B2 | 6/2005 | Morell et al. |
| 6,906,160 B2 | 6/2005 | Stevens et al. |
| 6,909,028 B1 | 6/2005 | Shawver et al. |
| 6,914,018 B1 | 7/2005 | Uitenbroek et al. |
| 6,927,184 B1 | 8/2005 | Jacobs-Hartwig et al. |
| 6,939,591 B2 | 9/2005 | Hutchinson et al. |
| 6,946,413 B2 | 9/2005 | Lange et al. |
| 6,960,635 B2 | 11/2005 | Stevens et al. |
| 6,982,231 B1 | 1/2006 | Uitenbroek et al. |
| 6,989,125 B2 | 1/2006 | Boney et al. |
| 6,992,158 B2 | 1/2006 | Datta et al. |
| 6,994,763 B2 | 2/2006 | Austin |
| 7,019,081 B2 | 3/2006 | Datta et al. |
| 7,022,632 B2 | 4/2006 | Hatta et al. |
| 7,026,404 B2 | 4/2006 | Cozewith et al. |
| 7,078,089 B2 | 7/2006 | Ellis et al. |
| 7,101,622 B2 | 9/2006 | Chang et al. |
| 7,101,623 B2 | 9/2006 | Jordan et al. |
| 7,199,203 B2 | 4/2007 | Stevens et al. |
| 7,261,551 B2 | 8/2007 | Hutchinson et al. |
| 7,300,895 B2 | 11/2007 | Kobayashi et al. |
| 7,318,961 B2 | 1/2008 | Loos et al. |
| 7,319,077 B2 | 1/2008 | Mehta et al. |
| 7,320,948 B2 | 1/2008 | Morman et al. |
| 7,329,621 B2 | 2/2008 | Collier, IV et al. |
| 7,332,204 B2 | 2/2008 | Hutchinson et al. |
| 7,335,273 B2 | 2/2008 | Neculescu et al. |
| 7,344,775 B2 | 3/2008 | Stevens et al. |
| 7,355,089 B2 | 4/2008 | Chang et al. |
| 7,355,091 B2 | 4/2008 | Kellenberger et al. |
| 7,404,811 B2 | 7/2008 | Ohnishi et al. |
| 7,405,171 B2 | 7/2008 | Tsujiyama et al. |
| 7,405,172 B2 | 7/2008 | Shigematsu et al. |

(56) References Cited

U.S. PATENT DOCUMENTS

| | | | |
|---|---|---|---|
| 7,413,803 B2 | 8/2008 | Jordan et al. |
| 7,425,517 B2 | 9/2008 | Deka et al. |
| 7,438,777 B2 | 10/2008 | Pourdeyhimi et al. |
| 7,439,301 B2 | 10/2008 | Handlin, Jr. |
| 7,445,831 B2 | 11/2008 | Ashraf et al. |
| 7,445,838 B2 | 11/2008 | Quinn |
| 7,452,832 B2 | 11/2008 | Bansal et al. |
| 7,462,573 B2 | 12/2008 | Tsujiyama et al. |
| 7,476,447 B2 | 1/2009 | Thomas |
| 7,491,666 B2 | 2/2009 | Smith et al. |
| 7,494,709 B2 | 2/2009 | Davis |
| 7,494,947 B2 | 2/2009 | Boscolo |
| 7,501,034 B2 | 3/2009 | Ashraf |
| 7,601,666 B2 | 10/2009 | Rix et al. |
| 7,795,366 B2 | 9/2010 | Yang et al. |
| 2002/0019507 A1 | 2/2002 | Karandinos et al. |
| 2002/0055316 A1 | 5/2002 | Araida et al. |
| 2002/0099347 A1 | 7/2002 | Chen et al. |
| 2003/0049436 A1 | 3/2003 | Hager et al. |
| 2003/0125696 A1 | 7/2003 | Morman et al. |
| 2003/0194939 A1 | 10/2003 | Schwarz |
| 2004/0110442 A1 | 6/2004 | Rhim et al. |
| 2004/0121687 A1 | 6/2004 | Morman et al. |
| 2004/0192147 A1* | 9/2004 | Smith et al. ............ 442/415 |
| 2004/0209540 A1 | 10/2004 | Schwarz |
| 2004/0236042 A1 | 11/2004 | Datta et al. |
| 2005/0019507 A1 | 1/2005 | Renz et al. |
| 2005/0027080 A1 | 2/2005 | Bodiford et al. |
| 2005/0095941 A1 | 5/2005 | Coronado et al. |
| 2005/0106978 A1 | 5/2005 | Cheng et al. |
| 2005/0130544 A1* | 6/2005 | Cheng et al. ............ 442/415 |
| 2005/0136773 A1 | 6/2005 | Yahiaoui et al. |
| 2005/0148263 A1 | 7/2005 | Zhou et al. |
| 2005/0170729 A1 | 8/2005 | Stadelman et al. |
| 2005/0244638 A1 | 11/2005 | Chang et al. |
| 2006/0003658 A1 | 1/2006 | Hall et al. |
| 2006/0135923 A1 | 6/2006 | Boggs et al. |
| 2006/0141886 A1 | 6/2006 | Brock et al. |
| 2006/0151914 A1 | 7/2006 | Gerndt et al. |
| 2006/0172647 A1 | 8/2006 | Mehta et al. |
| 2006/0173123 A1 | 8/2006 | Yang et al. |
| 2006/0199006 A1 | 9/2006 | Poon et al. |
| 2006/0210746 A1 | 9/2006 | Shi et al. |
| 2006/0270303 A1 | 11/2006 | Berrigan et al. |
| 2007/0004830 A1* | 1/2007 | Flood et al. ............ 524/69 |
| 2007/0017075 A1 | 1/2007 | Nguyen |
| 2007/0024447 A1 | 2/2007 | Burnside et al. |
| 2007/0078222 A1 | 4/2007 | Chang et al. |
| 2007/0092704 A1 | 4/2007 | Patel et al. |
| 2007/0123131 A1 | 5/2007 | Nguyen et al. |
| 2007/0135785 A1 | 6/2007 | Qin et al. |
| 2007/0141937 A1 | 6/2007 | Hendrix et al. |
| 2007/0161747 A1 | 7/2007 | Maier et al. |
| 2007/0173162 A1 | 7/2007 | Ethiopia et al. |
| 2007/0184256 A1 | 8/2007 | Okada et al. |
| 2007/0197117 A1 | 8/2007 | Austin et al. |
| 2007/0202330 A1 | 8/2007 | Peng et al. |
| 2007/0203301 A1 | 8/2007 | Autran et al. |
| 2007/0203469 A1 | 8/2007 | Ohnishi et al. |
| 2007/0254545 A1 | 11/2007 | Martin |
| 2007/0287348 A1 | 12/2007 | Autran et al. |
| 2008/0003910 A1 | 1/2008 | Hughes et al. |
| 2008/0014819 A1 | 1/2008 | Suzuki et al. |
| 2008/0026660 A1 | 1/2008 | Ogawa et al. |
| 2008/0038982 A1 | 2/2008 | Motomura et al. |
| 2008/0045917 A1 | 2/2008 | Autran et al. |
| 2008/0061476 A1 | 3/2008 | Hutchinson et al. |
| 2008/0076315 A1 | 3/2008 | McCormack et al. |
| 2008/0119102 A1 | 5/2008 | Hughes et al. |
| 2008/0132135 A1 | 6/2008 | Collias et al. |
| 2008/0132862 A1 | 6/2008 | Collias et al. |
| 2008/0132866 A1 | 6/2008 | Siqueira et al. |
| 2008/0160859 A1 | 7/2008 | Gupta et al. |
| 2008/0160862 A1 | 7/2008 | Sartori et al. |
| 2008/0161765 A1 | 7/2008 | Morman et al. |
| 2008/0172840 A1 | 7/2008 | Kacker et al. |
| 2008/0177242 A1 | 7/2008 | Chang et al. |
| 2008/0182116 A1 | 7/2008 | Dharmarajan et al. |
| 2008/0182468 A1 | 7/2008 | Dharmarajan et al. |
| 2008/0182473 A1 | 7/2008 | Chen et al. |
| 2008/0182940 A1 | 7/2008 | Dharmarajan et al. |
| 2008/0199673 A1* | 8/2008 | Allgeuer et al. ............ 428/219 |
| 2008/0207071 A1 | 8/2008 | Muslet et al. |
| 2008/0220273 A1 | 9/2008 | Weaver |
| 2008/0221540 A1 | 9/2008 | Thomas et al. |
| 2008/0233819 A1 | 9/2008 | Tsujiyama et al. |
| 2008/0233824 A1 | 9/2008 | Abed et al. |
| 2008/0237911 A1 | 10/2008 | Ardiff et al. |
| 2008/0241447 A1 | 10/2008 | Shi |
| 2008/0251492 A1 | 10/2008 | Shi |
| 2008/0287027 A1 | 11/2008 | Suzuki et al. |
| 2008/0299857 A1 | 12/2008 | Harding et al. |
| 2008/0300567 A1 | 12/2008 | Ohnishi et al. |
| 2008/0311815 A1 | 12/2008 | Gupta et al. |
| 2009/0058230 A1 | 3/2009 | Kear et al. |
| 2009/0058250 A1 | 3/2009 | Sin et al. |
| 2009/0058263 A1 | 3/2009 | Lai |
| 2009/0068419 A1 | 3/2009 | Pascavage |
| 2009/0068420 A1 | 3/2009 | Pascavage |
| 2009/0124153 A1 | 5/2009 | Dharmarajan et al. |
| 2009/0124154 A1 | 5/2009 | Harrington et al. |
| 2010/0081352 A1 | 4/2010 | Westwood |
| 2010/0124864 A1 | 5/2010 | Dharmarajan et al. |
| 2010/0222755 A1 | 9/2010 | Westwood |
| 2010/0222761 A1 | 9/2010 | Westwood et al. |
| 2010/0266818 A1 | 10/2010 | Westwood et al. |
| 2010/0267914 A1 | 10/2010 | Westwood et al. |

FOREIGN PATENT DOCUMENTS

| | | |
|---|---|---|
| CN | 1337300 | 2/2002 |
| CN | 1694804 | 11/2005 |
| EP | 0 129 368 | 12/1984 |
| EP | 0 277 003 | 8/1988 |
| EP | 0 277 004 | 8/1988 |
| EP | 0 426 637 | 5/1991 |
| EP | 0 432 755 | 6/1991 |
| EP | 0 495 375 | 7/1992 |
| EP | 0 500 944 | 9/1992 |
| EP | 0 520 732 | 12/1992 |
| EP | 0 534 863 | 3/1993 |
| EP | 0 570 982 | 11/1993 |
| EP | 0 573 403 | 12/1993 |
| EP | 1 066 957 | 1/2001 |
| EP | 1 066 961 | 1/2001 |
| EP | 1 070 087 | 1/2001 |
| EP | 1 138 472 | 10/2001 |
| EP | 1 174 257 | 1/2002 |
| EP | 1 614 699 | 1/2006 |
| EP | 1 712 351 | 10/2006 |
| EP | 1 834 015 | 9/2007 |
| EP | 1 877 237 | 1/2008 |
| EP | 1 980 390 | 10/2008 |
| GB | 2 404 347 | 2/2005 |
| JP | 04352865 | 12/1992 |
| JP | 05321115 | 12/1993 |
| JP | 07-070378 | 3/1995 |
| JP | 02/105833 | 4/2002 |
| JP | 2002105833 | 4/2002 |
| JP | 2005/171456 | 6/2005 |
| JP | 4753852 | 8/2007 |
| JP | 2007-277755 | 10/2007 |
| JP | 2007-321292 | 12/2007 |
| JP | 2009-126000 | 6/2009 |
| KR | 20040103953 | 12/2004 |
| KR | 20070017164 | 2/2007 |
| KR | 100722351 | 5/2007 |
| WO | WO 91/09882 | 7/1991 |
| WO | WO 92/00333 | 1/1992 |
| WO | WO 92/16361 | 10/1992 |
| WO | WO 92/16366 | 10/1992 |
| WO | WO 94/03506 | 2/1994 |
| WO | WO 94/26816 | 11/1994 |
| WO | WO 98/39384 | 9/1998 |

(56) References Cited

FOREIGN PATENT DOCUMENTS

| WO | WO 00/01745 | 1/2000 | | |
|----|----|----|----|----|
| WO | WO 00/18994 | 4/2000 | | |
| WO | WO 00/37723 | 6/2000 | | |
| WO | WO 00/38911 | 7/2000 | | |
| WO | WO 01/00915 | 1/2001 | | |
| WO | WO 01/00917 | 1/2001 | | |
| WO | WO 02/34511 | 5/2002 | | |
| WO | WO 02/36651 | 5/2002 | | |
| WO | WO 03/040201 | 5/2003 | | |
| WO | WO 2004/038078 | 5/2004 | | |
| WO | WO 2005/049672 | 6/2005 | | |
| WO | WO 2006/101631 | 9/2006 | | |
| WO | WO 2007/030170 | 3/2007 | | |
| WO | WO 2007024447 A1 | * | 3/2007 | ............ D04H 1/42 |
| WO | WO 2007/140163 | 12/2007 | | |
| WO | WO 2007/142736 | 12/2007 | | |
| WO | WO 2008/094337 | 8/2008 | | |
| WO | WO 2009/064583 | 5/2009 | | |
| WO | WO 2009/126712 | 10/2009 | | |
| WO | WO 2010/001273 | 1/2010 | | |
| WO | WO 2010/039579 | 4/2010 | | |
| WO | WO 2010/039583 | 4/2010 | | |
| WO | WO 2010/098792 | 9/2010 | | |
| WO | WO 2010/098793 | 9/2010 | | |
| WO | WO 2011/041575 | 4/2011 | | |

OTHER PUBLICATIONS

Dutta, S. et al., "*More Efficient Manufacture of Controlled-rheology Polypropylene*", Society of Plastics Engineers, Plastics Research Online (2010).

Harrington, B.A. et al.,"*Processability and Fabric Attributes of Specialty Polyolefin Elastomers*", INTC® 2005, International Nonwovens Technical Conference, Conference Proceedings, St. Louis, MS, United States, Sep. 19-22, 2005.

Kacker, S. et al.,"Properties of Elastic Nonwoven Fabrics Based Upon Specialty Polyolefin Elastomers", INTCE® 2006, International Nonwovens Technical Conference, Conference Proceedings, Houston, TX, United States, Sep. 25-28, 2006.

Srivatsan, S. et al., "*Novel Polyolefin Resin for Elastic Spunbond & Melt Blown Applications*", INTC® 2004, Toronto, Canada, Sep. 20-23, 2004.

VISTAMAXX™ 2120 Propylene-based Elastomer, data sheets. <URL: www.specialtyelastomers.com>.

VISTAMAXX™ Specialty Elastomers for Meltblown Fabrics, data sheet. <URL: www.vistamaxxelastomers.com.

VISTAMAXX™ Specialty Elastomers VM2320, data sheet. <URL: www.vistamaxxelastomers.com.

VISTAMAXX™ Specialty Elastomers for Spunbond Fabrics, data sheet. URL: www.vistamaxxelastomers.com.

VISTAMAXX™ Specialty Elastomers—Unlimited Creative Potential. Imagine That! URL: www.vistamaxxelastomers.com.

Wheeler, L.M. et al., "*Gel Permeation Chromatography/Fourier Transform Infrared Interface for Polymer Analysis*", Applied Spectroscopy, vol. 47, No. 8, pp. 1128-1130 (1993).

Barden, B., "*Coated Fabrics*", Kirk-Othmer Encyclopedia of Chemical Technology, John Wiley & Sons, pp. 1-13 (1993).

Rooney, J.G. et al., "*On Line Determination by Light Scattering of Mechanical Degradation in the GPC Process*", Liquid Chromatography of Polymers and Related Materials III, Cazes, J. Ed., Marcel Dekker, pp. 207-234 (1981).

Chapman, R., "*Nonwoven Fabrics, Staple Fibers*", Kirk-Othmer Encyclopedia of Chemical Technology, John Wiley & Sons, pp. 1-27 (2005).

Cheng, H. N. "$^{13}C$ *NMR Analysis of Ethylene-Propylene Rubbers*", Macromolecules, vol. 17, pp. 1950-1955 (1984).

Index05 Daily News, Apr. 14, 2005, in association with Nonwovens Report International, pp. 4.

Index08, Geneva Palexpo Apr. 15-18, 2008, Biax-Fiberfilm Corporation.

E. P. Moore, Jr. ed., "9.2.1.1 Melt-Blown Fibers," in Polypropylene Handbook, Polymerization, Charaterization, Properties, Processing, Applications, pp. 314-324.

Prabhu, P. et al., "*Evidence for Ethylene-Propylene Block Copolymer Formation*", J. Poly. Sci.: Polymer Letters Ed., vol. 18, pp. 389-394 (1980).

Rudnick, L.R. et al., "*Poly(α-olefins)*", Synthetic Lubricants and High Performance Functional Fluids, $2^{nd}$ Edition, Marcel Dekker, Inc., pp. 3-52 (1999).

Seyam, A.M.et al., "*An Examination of the Hydroentangling Process Variables*", in Int'l Nonwovens J., pp. 25-33 (Spring 2005).

Ver Strate, G. et al., "*Near Monodisperse Ethylene-Propylene Copolymers by Direct Ziegler-Natta Polymerization. Preparation, Characterization, Properties*", Macromolecules, vol. 21, pp. 3360-3371 (1988).

Zhao, R., "*Melt Blowing Polyoxymethylene Copolymer*", in Int'l Nonwovens J., pp. 19-24 (Summer 2005).

Zhao, R., "Stretching the Value of Melt Blown with Cellulose Microfiber and Elastic Resin," a Paper for Insight 2004, Austin, Texas, USA, Oct. 10-14, 2004, Biax Fiberfilm Corporation, Greenville, Wisconsin, pp. 1-13.

* cited by examiner

BIAXIALLY ELASTIC NONWOVEN LAMINATES HAVING INELASTIC ZONES

CROSS-REFERENCE TO RELATED APPLICATIONS

The present application claims priority from U.S. Ser. No. 61/171,135, filed Apr. 21, 2009, and U.S. Ser. No. 61/156,078, filed Feb. 27, 2009, all of which are incorporated by reference in their entirety. This application is related to international patent application nos. PCT/US09/58263, and PCT/US09/58245, and PCT/US09/58230, concurrently filed on Sep. 24, 2009, which are all incorporated by reference in their entirety.

FIELD OF THE INVENTION

The current disclosure relates to the production of biaxially elastic nonwoven fabrics and methods of processing the laminates that are made therefrom, and more particularly related to biaxially elastic laminates that comprise a polyolefin-based elastomeric nonwoven fabric and are processed to impart some constraint on the laminate.

BACKGROUND OF THE INVENTION

Typically, elastic components used in the hygiene absorbents market are designed to have either cross direction-stretch ("CD") only or machine direction-stretch ("MD") only. Products with CD-stretch only are usually for the baby diaper or training pant market where as MD-stretch only products are usually required or preferred for the adult incontinence market. The reason for these two different preferred orientations is directly related to the orientation of the garment and fabric feeds during the converting and manufacturing process.

Some level of biaxial stretch may be required for the more sophisticated adult incontinence garments. In adult incontinence garments, in order to maintain leakage protection, the product needs to fit comfortably with a high level of conformity over a large area around the waist, abdomen, lower back, and crotch. In order to do this the fabrics need to be able to stretch around the user's waist as well as to offer some stretch vertically along the torso of the user.

A unique approach to manufacturing a single fabric that combines both an elastic core with an aesthetically pleasing and extensible outer cover is to meltspin relatively high molecular weight elastomers to provide adequate elasticity and provide at least one softer outer cover or "facing" layer bound to the elastic fabric to form a laminate. The layered fabric construction would be biaxially elastic, making it more challenging to use the fabric in various hygiene converting processes owing to the force required to unroll and feed the fabric into the machine which can cause potential dimensional changes, narrowing/necking of the fabric, making the manufacturing process more challenging. It is much preferred in certain articles to have the fabric elastic in only one direction and non-elastic in the other direction.

To overcome the converting challenges posed by biaxially elastic fabrics, the inventor has found that calendaring can be utilized to introduce inelastic zones in the fabric. The orientation as well as the number, spacing, size and pattern of these calendared zones can be used to create CD-stretch only, MD-stretch only or combinations of both resulting in controlled levels of biaxial stretch.

A further advantage to this process is that it can enable the creation of "deadzones" or larger inelastic zones in the fabric. The importance of these in-elastic zones is that it allows the elastic wings and "ears" in baby diapers or side panels in training pants, or even in certain adult incontinence garments, to be more robustly attached to the chassis, as well as providing an attachment point for the hook/diaper fastening system. Without deadzones, concerns exist that creep and shear of the elastic fabric could occur adjacent to the attachment point to the chassis or hook which could cause issues with fit and function of the garment, resulting in increased leakage or failure of the garment to remain in place on the baby or adult.

Relevant prior publications include U.S. Pat. No. 6,465,073 and U.S. Pat. No. 6,717,028.

SUMMARY OF THE INVENTION

Disclosed herein is a method of imparting constraint in a biaxially elastic nonwoven laminate comprising providing a biaxially elastic nonwoven laminate (also, "BEL") comprising at least one meltspun elastic fabric and at least one extensible fabric or film; and fusing at least, or preferably, only a portion(s) of the at least one meltspun elastic fabric to at least one of the extensible fabrics to create at least one inelastic zone. Desirably, the at least one meltspun elastic fabric and at least one extensible fabric or film is biaxially elastic, and referred to as being "nonwoven" due to the at least one layer of meltspun elastomer.

Also disclosed herein is a constrained biaxially elastic nonwoven laminate comprising at least one meltspun elastic fabric and at least one extensible fabric or film, wherein at least one portion of the fabric layers are fused to one another in discrete zones that are parallel to the CD of the biaxially elastic laminate, parallel to the MD of the biaxially elastic laminate, or at some orientation there between.

The fusing step can be performed by any suitable means such as by calendering, adhesives, sonic energy, microwave energy or other electromagnetic energy, or other processes known in the art. The fibers that make up the meltspun elastic fabric comprise at least one elastomer, preferably a propylene-based elastomer, and more preferably a propylene-α-olefin elastomer, having a melt flow rate (230° C./2.16 kg) of less than 80 dg/min. Any other meltspinnable material may be blended with the elastomer to form the elastic layer, and most any material can be included with the elastic layer that can be combined by other methods such as coform methods, etc. The extensible fabric or film can be made using any material suitable for woven or nonwoven fabrics such as an elastomer, thermoplastic, cotton (and other natural materials) or blends of any of these materials. The fibers that make up any one of the layers of the constrained biaxially elastic nonwoven laminate can be monocomponent or bicomponent, and may have any desirable cross-sectional geometry.

The various descriptive elements and numerical ranges disclosed herein can be combined with other descriptive elements and numerical ranges to describe preferred embodiments of the multilayer laminates, articles and the various methods of making these; further, any upper numerical limit of an element can be combined with any lower numerical limit of the same element to describe preferred embodiments. In this regard, the phrase "within the range from X to Y" is intended to include within that range the "X" and "Y" values.

DETAILED DESCRIPTION

Introduction

Figure 1A:
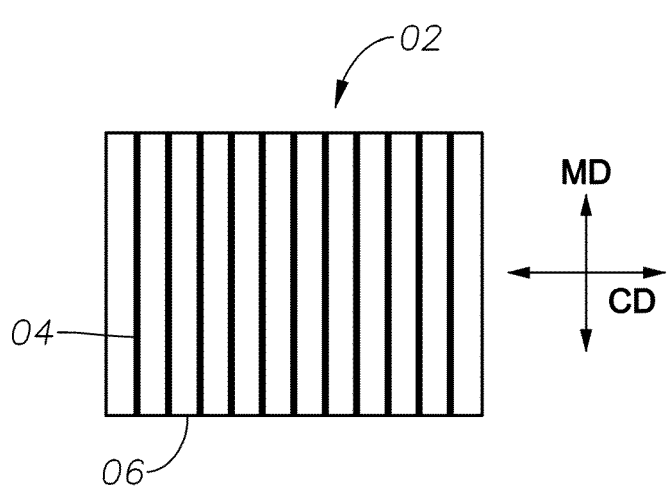
FIG. 1a is a representation of one embodiment of a constrained biaxially elastic nonwoven laminate having inelastic zones in the form of lines of desirable width running continuously in the MD direction, the representation viewed from above the layered fabric structure.

Described herein is a biaxially elastic nonwoven laminate that has been processed to form constraints in the laminate. Further, the constraints take the form of "inelastic zones" (or "deadzones") in the multi-layer laminate that aid in its processing to form a final article such as a diaper or adult incontinence garment. The inelastic zones may have dimensions such that its length is continuous or discontinuous from one edge of the fabric to the other, and has a width of, for example, at least 1 or 2 or 3 or 5 or 10 mm. The inelastic zones may take any shape. A "biaxially elastic nonwoven laminate" ("BEL") is a layered construction that includes at least one meltspun elastic fabric bound to at least one other layer of fabric or film, preferably an extensible fabric or film, the layered construction being elastic in both the machine direction ("MD") and cross direction ("CD") of the fabric. The BEL is biaxially elastic as formed and needs no mechanical or physical processing such as necking and calendering to impart biaxial elasticity, although such secondary treatments may be used as desired. This disclosure describes the constrained BELs and methods of making the BELs and constrained BELs.

As used herein, a "nonwoven fabric" (or "fabric") is a textile structure (e.g., a sheet, web, or batt) of directionally or randomly oriented fibers, without a yarn being first made or involving a weaving or knitting process. The fabrics described herein comprise a network of fibers or continuous filaments that may be strengthened by mechanical, chemical, or thermally interlocking processes. Examples of nonwoven fabrics include meltspun fabrics (made by meltspinning processes), carded fabrics, dry-laid fabrics (e.g., carded fabrics or air-laid fabrics) and wet-laid fabrics. Any of these types of fabrics may be physically entangled by means known in the art and then may be referred to as "spunlaced" fabrics.

As used herein, a "meltspun fabric" refers to a fabric made by a method wherein a web of fibers is formed from a polymeric melt or solution that is extruded through small holes (on the order of 0.1 to 2 mm diameter) or spinneret nozzles from one or more dies to form thin filaments (on the order of 0.1 to 250 µm) which are then attenuated by an appropriate means such as by high pressure air and laid down on a moving screen, drum or other suitable device. "Meltspinning" processes include, but are not limited to, spunbonding, solution spinning, coforming, and meltblowing. Meltspun fibers typically have an average diameter of less than 250 µm. Non-limiting examples of suitable polymers used to make meltspun fibers are polypropylene (e.g., homopolymers, copolymers, impact copolymers), polyester (e.g., PET), polyamide, polyurethane (e.g., Lycra™), polyethylene (e.g., LDPE, LLDPE, HDPE, plastomers), polycarbonate, and blends thereof.

As used herein, "spunbond" refers to a meltspinning method of forming a fabric in which a polymeric melt or solution is extruded through spinnerets to form filaments which are attenuated by suitable means such as by electrostatic charge or high velocity air, the attenuated filaments (at this stage becoming "fibers") are then laid down on a moving screen to form the fabric. The laid down fibers may optionally be passed through heated calenders or some other suitable means to consolidate the fibers into a cohesive structure. In certain embodiments, the attenuating air in spunbond processes is at less than about 50° C. Fibers resulting from a spunbond process typically have some degree of uniaxial molecular orientation imparted therein. Spunbond fibers tend to be, though are not necessarily, of an average diameter of greater than about 7 µm.

As used herein, "meltblown" refers to a meltspinning method of forming a fabric in which a polymeric melt or solution is extruded through spinnerets to form filaments which are attenuated by suitable means such as by electrostatic charge or high velocity air, such attenuated filaments (at this stage becoming "fibers") are then laid down on a moving screen to form the fabric. In certain embodiments there may or may not be a separate quench air source. In certain embodiments, the attenuating air in meltblown processes is at greater than about 50° C. Meltblown fibers tend to be, though are not necessarily, of an average diameter of less than about 7 µm.

As used herein, the term "coform" refers to another meltspinning process in which at least one meltspun die head is arranged near an apparatus through which other materials are added to the fabric while it is forming. Such other materials may be pulp, superabsorbent particles, cellulose or staple fibers, for example. Coform processes are described in U.S. Pat. No. 4,818,464 and U.S. Pat. No. 4,100,324, both incorporated by reference. For purposes of this disclosure, the coform process is considered a particular embodiment of meltspun processes.

As used herein, a "fiber" is a structure whose length is very much greater than its diameter or breadth; the average diameter is on the order of 0.1 to 350 µm, and comprises natural and/or synthetic materials. Fibers can be "mono-component" or "bi-component". Bicomponent fibers comprise two or more polymers of different chemical and/or physical properties extruded from separate melt/liquid feeding devices (e.g., extruders) but through the same spinneret with both polymers within the same filament, resulting in fibers having distinct areas comprised of each different polymer. The configuration of such a bicomponent fiber may be, for example, sheath/core arrangement wherein one polymer is surrounded by another or may be side-by-side as in U.S. Pat. No. 5,108,820, incorporated by reference, segmented or "pie" wherein the different domains of the polymers are in alternating segments in the shape of "pie slices", or "islands in the sea" such as in U.S. Pat. No. 7,413,803, incorporated by reference. Fibers can also be "mono-constituent" or "bi-constituent", meaning that they comprise of a single polymer or a blend of two or more polymers.

The fibers made by the processes described herein may be referred to as being "meltspun", "spunbond" or "meltblown."

The meltspun fibers may have any desirable average diameter, and in certain embodiments are within the range from 0.1 or 1 or 4 to 15 or 20 or 40 or 50 or 150 or 250 μm, or expressed another way, a denier (g/9000 m) of less than 5.0 or 3.0 or 2.0 or 1.9 or 1.8 or 1.6 or 1.4 or 1.2 or 1.0.

As used herein, an "in situ laminate" (or "ISL") refers to a structure that comprises at least two fabric layers that are made by the in situ meltspinning process described U.S. Ser. No. 61/156,078 filed Feb. 27, 2009, incorporated by reference. A "composite" refers to a structure that comprises at least one ISL and at least one other layer of material (or "extensible layer") such as a film, another fabric, or another ISL made from any suitable material. The ISL and ISL composite comprising an ISL as used herein are biaxially elastic in preferred embodiments, and thus are an embodiment of a BEL. The ILS composites may be made, for example, by sequentially depositing onto a moving forming belt first a meltspun fabric layer, then depositing another meltspun fabric layer or adding a carded or dry-laid fabric on top of the first meltspun fabric layer, then adding a meltspun fabric layer on top of those layers, optionally followed by some method to adhere the various layered materials, such as by thermal point bonding or the inherent tendency of the layers to adhere to one another, application of an adhesive, use of sonic energy, hydroentangling, etc. Alternatively, the fabric layers may be made individually, collected in rolls, and combined in a separate bonding step or steps. The ISLs and ISL composites may also have various numbers of layers in many different configurations and may include other materials like films, adhesives, textile materials, absorbent materials, (e.g., pulp, paper, super absorbent particles, etc.) and others as disclosed in, for example, U.S. Pat. No. 6,503,853, incorporated by reference, coform materials, meltblown and spunbond materials, or airlaid materials, etc.

As used herein, materials (e.g., fibers, fabrics, laminates) referred to as being "elastic" or "elastomeric" are those that, upon application of a stretching force, are stretchable in at least one direction (e.g., the CD, MD or therebetween), and which upon release of the stretching force, contracts/returns to approximately its original dimension. For example, a stretched material may have a stretched length that is at least 50% or 80% greater than its relaxed unstretched length, and which will recover to within at least 50% of its stretched length upon release of the stretching force. The term "extensible" refers to a material that stretches or extends in the direction of an applied force by at least 50% of its relaxed length or width. Extensible fabrics often accompany elastomeric fabric or film layers of common articles (e.g., diapers, etc.) and are formed from a material that is extensible (e.g., polyurethanes, styrenic block copolymers, ethylene vinyl acetates, certain polypropylene copolymers, polyethylenes, and blends thereof), or formed by mechanically distorting or twisting a fabric (natural or synthetic).

As used herein, a "film" is a flat unsupported section of a polymeric (e.g., thermoplastic and/or elastomeric) material whose thickness is very small in relation to its width and length and has a continuous or nearly continuous macroscopic morphology throughout its structure allowing for the passage of air at diffusion-limited rates or lower. This definition is not meant, however, to exclude so called "microporus" films made by any means known in the art, such as, for example, by inclusion in a film of an additive that creates porosity upon activation (e.g., application of heat, etc.). Such additives include clays, calcium carbonate, and others well known in the art and described particularly in U.S. Pat. No. 6,632,212, incorporated by reference. The BELs described herein may include one or more film layers and can comprise any material as described herein for the fabrics. In certain embodiments, films are absent from the BELs described herein.

Elastomer

The BEL and constrained BEL includes at least one meltspun elastic fabric layer. The meltspun elastic layer can be formed by any suitable technique, but preferably using the meltspinning method described herein. The elastomer used to form the elastic fabric can comprise any suitable elastomer capable of being melt-extruded and meltspun. In one embodiment, the elastic fabric comprises an elastomer selected from the group consisting of propylene-α-olefin elastomers, ethylene-α-olefin random and block copolymers (e.g., Infuse™ elastomers), natural rubber ("NR"), synthetic polyisoprene ("IR"), butyl rubber (copolymer of isobutylene and isoprene, "IIR"), halogenated butyl rubbers (chloro-butyl rubber: "CIIR"; bromo-butyl rubber: "BIIR"), polybutadiene ("BR"), styrene-butadiene rubber ("SBR"), nitrile rubber, hydrogenated nitrile rubbers, chloroprene rubber ("CR"), polychloroprene, neoprene, ethylene-propylene rubber ("EPM"), ethylene-propylene-diene rubber ("EPDM"), epichlorohydrin rubber ("ECO"), polyacrylic rubber (e.g., "ACM", "ABR"), silicone rubber, fluorosilicone rubber, fluoroelastomers, perfluoroelastomers, polyether block amides ("PEBA"), chlorosulfonated polyethylene ("CSM"), ethylene-vinyl acetate ("EVA"), thermoplastic elastomers ("TPE"), thermoplastic vulcanizates ("TPV"), thermoplastic polyurethane ("TPU"), thermoplastic polyolefins ("TPO") (random and block), polysulfide rubber, or blends of any two or more of these elastomers. These materials, individually or blended, can be at any molecular weight that will facilitate meltspinning into a nonwoven fabric. The elastic fabric may comprise from 10 or 20 or 30 or 40 to 50 or 70 or 80 or 90 or 95 or 100%, by weight of the fabric, of one or more elastomers, and may consist essentially of one or more elastomers in certain embodiments, and consist essentially of one elastomer in another embodiment. The remainder of the elastic layer may comprise any thermoplastic material, wood or viscose material, or other absorbent material as is known in the art.

In a preferred embodiment, the elastic layer comprises from 10 or 20 or 30 or 40 to 50 or 70 or 80 or 90 or 95 or 100%, by weight of the fabric, of a polyolefin-based elastomer. By "polyolefin-based", what is meant is a polymeric elastomer made up of at least 50 wt % olefin derived units, examples of which include ethylene and C3 to C16 α-olefins, and combinations thereof. Preferred polyolefin-based elastomers are those that comprise at least 50 wt % of ethylene, or propylene, or butene-derived units. In a particular embodiment, the elastic layer comprises the polyolefin-based elastomer, a propylene-α-olefin elastomer in a particular embodiment, having an MFR of less than 80 or 60 or 40 or 24 or 20 dg/min. In a particular embodiment, the elastic layer consists essentially of the propylene-α-olefin elastomer.

As used herein, a "propylene-α-olefin elastomer" refers to a random copolymer that is elastomeric, has moderate crystallinity and possesses propylene-derived units and one or more units derived from ethylene, higher α-olefins and/or optionally diene-derived units. The overall comonomer content of the copolymer is from 5 to 35 wt % in one embodiment. In some embodiments, where more than one comonomer is present, the amount of a particular comonomer may be less than 5 wt %, but the combined comonomer content is greater than 5 wt %. The propylene-α-olefin elastomers may be described by any number of different parameters, and those parameters may comprise a numerical range made up of any desirable upper limit with any desirable lower limit as described herein.

The polyolefin-based elastomer and the propylene-α-olefin elastomer may be either a random copolymer (the comonomer-derived units are randomly distributed along the polymer backbone) or a block copolymer (the comonomer-derived units occur along long sequences), or any variation thereof (having some properties of each). The presence of randomness or "blocky-ness" in a copolymer can be determined by $^{13}C$ NMR as is known in the art and described in, for example, 18 J. POLY. SCI.: POLY. LETT. ED. 389-394 (1980).

In certain embodiments, the propylene-α-olefin elastomer comprises ethylene or C4 to C10 α-olefin-derived units (or "comonomer-derived units") within the range of 5 or 7 or 9 to 13 or 16 or 18 wt % by weight of the elastomer. The propylene-α-olefin elastomer may also comprise two different comonomer-derived units. Also, these copolymers and terpolymers may comprise diene-derived units as described below. In a particular embodiment, the propylene-α-olefin elastomer comprises propylene-derived units and comonomer units selected from ethylene, 1-hexene, and 1-octene. And in a more particular embodiment, the comonomer is ethylene, and thus the propylene-α-olefin elastomer is a propylene-ethylene copolymer. When dienes are present, the propylene-α-olefin elastomer comprises less than 5 or 3 wt %, by weight of the elastomer, of diene-derived units, or within the range from 0.1 or 0.5 or 1 to 5 wt % in other embodiments. Suitable dienes include for example 1,4-hexadiene, 1,6-octadiene, 5-methyl-1,4-hexadiene, 3,7-dimethyl-1,6-octadiene, dicyclopentadiene ("DCPD"), ethylidiene norbornene ("ENB"), norbornadiene, 5-vinyl-2-norbornene ("VNB"), and combinations thereof.

In certain embodiments, the propylene-α-olefin elastomers have a triad tacticity of three propylene units, as measured by $^{13}C$ NMR, of 75% or greater, 80% or greater, 82% or greater, 85% or greater, or 90% or greater. In one embodiment, the triad tacticity is within the range from 50 to 99%, and from 60 to 99% in another embodiment, and from 75 to 99% in yet another embodiment, and from 80 to 99% in yet another embodiment, and from 60 to 97% in yet another embodiment. Triad tacticity is determined as follows: The tacticity index, expressed herein as "m/r", is determined by $^{13}C$ nuclear magnetic resonance ("NMR") techniques. The tacticity index m/r is calculated as defined by H. N. Cheng in 17 MACROMOLECULES 1950 (1984), incorporated by reference. The designation "m" or "r" describes the stereochemistry of pairs of contiguous propylene groups, "m" referring to meso and "r" to racemic. An m/r ratio of 1.0 generally describes a syndiotactic polymer and an m/r ratio of 2.0 an atactic material. An isotactic material theoretically may have a ratio approaching infinity, and many by-product atactic polymers have sufficient isotactic content to result in ratios of greater than 50. Embodiments of the propylene-α-olefin elastomer have a tacticity index m/r ranging from a lower limit of 4 or 6 to an upper limit of 8 or 10 or 12.

In certain embodiments, the propylene-α-olefin elastomers have a heat of fusion ("$H_f$"), determined according to the Differential Scanning Calorimetry ("DSC") procedure described herein within the range from 0.5 or 1 or 5 J/g, to 35 or 40 or 50 or 65 or 75 or 80 J/g. In certain embodiments, the $H_f$ value is less than 80 or 75 or 60 or 50 or 40 J/g. In certain embodiments, the propylene-α-olefin elastomers have a percent crystallinity within the range from 0.5 to 40%, and from 1 to 30% in another embodiment, and from 5 to 25% in yet another embodiment, wherein "percent crystallinity" is determined according to the DSC procedure described herein. The thermal energy for the highest order of polypropylene is estimated at 189 J/g (i.e., 100% crystallinity is equal to 189 J/g). In another embodiment, the propylene-α-olefin elastomer has a crystallinity of less than 40%, and within the range from 0.25 to 25% in another embodiment, and from 0.5 to 22% in yet another embodiment, and from 0.5 to 20% in yet another embodiment.

In certain embodiments, the propylene-α-olefin elastomers have a single peak melting transition as determined by DSC; in certain embodiments the propylene-α-olefin elastomer has a primary peak melting transition at from less than 90° C., with a broad end-of-melt transition at greater than about 110° C. The peak "melting point" ("$T_m$") is defined as the temperature of the greatest heat absorption within the range of melting of the sample. However, the propylene-α-olefin elastomer may show secondary melting peaks adjacent to the principal peak, and/or the end-of-melt transition, but for purposes herein, such secondary melting peaks are considered together as a single melting point, with the highest of these peaks being considered the $T_m$ of the propylene-α-olefin elastomer. The propylene-α-olefin elastomers have a peak $T_m$ from less than 105 or 100 or 90 or 80 or 70° C. in certain embodiments; and within the range from 10 or 15 or 20 or 25 to 65 or 75 or 80 or 95 or 105° C. in other another embodiments.

The procedure for DSC determinations is as follows. About 0.5 grams of polymer was weighed out and pressed to a thickness of about 15-20 mils (about 381-508 microns) at about 140° C.-150° C., using a "DSC mold" and Mylar™ backing sheet. The pressed pad was allowed to cool to ambient temperature by hanging in air (the Mylar™ backing sheet was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two maxima, the maxima at the highest temperature was taken as the melting point within the range of melting of the sample relative to a baseline measurement for the increasing heat capacity of the polymer as a function of temperature.

In certain embodiments, the propylene-α-olefin elastomers have a density within the range from 0.840 to 0.920 g/cm³, and from 0.845 to 0.900 g/cm³ in another embodiment, and from 0.850 to 0.890 g/cm³ in yet another embodiment, the values measured at room temperature per the ASTM D-1505 test method.

In certain embodiments, the propylene-α-olefin elastomers have a melt flow rate ("MFR", ASTM D1238, 2.16 kg, 230° C.), from less than 80 or 70 or 50 or 40 or 30 or 24 or 20 dg/min, and within the range from 0.1 or 1 or 4 or 6 to 12 or 16 or 20 or 40 or 60 or 80 dg/min in other embodiments.

In certain embodiments, the propylene-α-olefin elastomers have a Shore A hardness (ASTM D2240) within the range from 20 or 40 to 80 or 90 Shore A. In yet another embodiment, the propylene-α-olefin elastomers possess an Ultimate Elongation (ASTM D 412) of greater than 500% or 1000% or 2000%; and within the range from 500% to 800 or 1200 or 1800 or 2000 or 3000% in other embodiments.

In certain embodiments, the propylene-α-olefin elastomers have a weight average molecular weight ("Mw") value within the range from 50,000 to 1,000,000 g/mole, and from 60,000 to 600,000 in another embodiment, and from 70,000 to 400,000 in yet another embodiment. The propylene-α-olefin elastomers have a number average molecular weight ("Mn") value within the range from 10,000 to 500,000 g/mole in certain embodiments, and from 20,000 to 300,000 in yet another embodiment, and from 30,000 to 200,000 in yet another embodiment. The propylene-α-olefin elastomers have a z-average molecular weight ("Mz") value within the range from 80,000 to 3,000,000 g/mole in certain embodiments, and from 100,000 to 700,000 in another embodiment, and from 120,000 to 500,000 in yet another embodiment.

In certain embodiments, a desirable molecular weight (and hence, a desirable MFR) is achieved by visbreaking the propylene-α-olefin elastomer. The "visbroken propylene-α-olefin elastomer" (also known in the art as "controlled rheology") is the copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, the visbroken elastomer may be the reaction product of a visbreaking agent and the elastomer. In particular, a visbroken propylene-α-olefin elastomer is one that has been treated with a visbreaking agent such that its MFR is increased, in one embodiment by at least 10%, and at least 20% in another embodiment relative to the MFR value prior to treatment. In certain embodiments, the process of making the fibers and fabrics excludes any visbreaking agents from the extruder and other parts of the apparatus. The propylene-α-olefin elastomer in this case is called a "reactor grade" elastomer. By "excludes" or "excluded," what is meant is that visbreaking agents such as peroxides, hydroxylamine esters, oxygen (or air) and other oxidizing and free-radical generating agents are not deliberately added to the extruder or any other component of the fiber forming apparatus downstream of the extruder. Thus, in this embodiment the elastomer being blown into a fiber and fabric is the elastomer having the desired MFR as introduced into the extruder feeding the fiber forming apparatus.

In certain embodiments, the molecular weight distribution ("MWD") of the propylene-α-olefin elastomers is within the range from 1.5 or 1.8 or 2.0 to 3.0 or 3.5 or 4.0 or 5.0. Techniques for determining the molecular weight (Mn, Mz and Mw) and MWD are as follows, and as in Verstate et al. in 21 MACROMOLECULES 3360 (1988), incorporated by reference. Conditions described herein govern over published test conditions. Molecular weight and MWD are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804, and 805 are used. This technique is discussed in LIQUID CHROMATOGRAPHY OF POLYMERS AND RELATED MATERIALS III 207 (J. Cazes ed., Marcel Dekker, 1981), incorporated by reference. No corrections for column spreading were employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin elastomers described herein can be produced using any catalyst and/or process known for producing polypropylenes. In certain embodiments, the propylene-α-olefin elastomers can include copolymers prepared according to the procedures in WO 02/36651, U.S. Pat. No. 6,992,158, and/or WO 00/01745, all of which are incorporated by reference. Preferred methods for producing the propylene-α-olefin elastomers are found in U.S. 2004/0236042 and U.S. Pat. No. 6,881,800, both of which are incorporated by reference. Preferred propylene-α-olefin elastomers are available commercially under the trade names Vistamaxx™ (ExxonMobil Chemical Company, Houston, Tex., USA) and Versify™ (The Dow Chemical Company, Midland, Mich., USA), certain grades of Tafmer™ XM or Notio™ (Mitsui Company, Japan) and certain grades of Softel™ (Basell Polyolefins of the Netherlands).

Although the "propylene-α-olefin elastomer" component of the fiber and fabric compositions is sometimes discussed as a single polymer, also contemplated by the term are blends of two or more different propylene-α-olefin elastomers having the properties within the ranges described herein.

Meltspinning Process and Constructing the BELs

The BELs may be produced by any suitable technique for incorporating an elastic meltspun fabric. In certain embodiments, the elastic fabric is formed by a meltspinning process, preferably a meltblown process. A extensible layer of fabric and/or film may be attached to the elastic fabric by any suitable technique such as by lamination or adherence of a preformed fabric in-line, or simultaneous or near simultaneous meltspinning of the secondary or facing layer such that it adheres to the elastic fabric, or by an in situ lamination ("ISL") process as previously described. If formed by an ISL technique, each fabric and/or film layer must of course be meltspinnable. However, even in such layered structures, a composite can be made of such ISLs and secondary layers that may not be meltspun such as spunlaced fabrics and/or other textile fabrics.

The formation of the meltspun elastic fabric requires the manufacture of fibers by extrusion through a meltspinning apparatus that includes at least one die capable of handling the appropriate melt temperatures and pressures to spin fine denier fibers. In particular, the apparatus has at least one die comprising multiple nozzles, each fluidly connected to its own extruder to allow different materials to be meltspun through the nozzles. The spinning nozzle defines a narrow orifice through which the molten polymer is meltspun into a filament. Each die can have any number of nozzles. In certain embodiments the nozzle density ranges from 20 or 40 or 50 nozzles/inch to 120 or 150 or 200 or 300 or 350 nozzles/inch. The extrusion process is typically accompanied by mechanical or aerodynamic drawing of the fibers. The BELs described herein may be manufactured by any technique known in the art capable of meltspinning extrudable polymers. In one embodiment, the meltspun BELs are meltspun from an apparatus that can operate at a melt pressure from greater than 200 psi (1.38 MPa) or 500 psi (3.45 MPa) or more and a melt temperature within the range from 50 and 350° C.

In certain embodiments, the process of making the BELs and fabrics excludes any visbreaking agents from the melt-blowing extruder and other parts of the apparatus. By "excludes" or "excluded," what is meant is that visbreaking agents such as peroxides, hydroxylamine esters, and other oxidizing and free-radical generating agents are not added to the extruder or any other component of the apparatus downstream of the extruder in the meltblowing apparatus. Thus, the elastomer or other material being spun into a fiber and fabric is the material having the desired MFR as introduced into the extruder feeding the meltblowing apparatus.

Examples of suitable meltspinning equipment that may be used for producing at least the elastic fabrics (and the fibers that make up the fabrics) and other extensible fabric layers described herein are disclosed in U.S. Pat. No. 4,380,570, U.S. Pat. No. 5,476,616, U.S. 2004/0209540, and by R. Zhao, "Melt Blowing Polyoxymethylene Copolymer" in INT'L NON-WOVENS J., 19-24 (Summer 2005), each of which is incorporated by reference. Equipment capable of meltblowing is used in a particular embodiment. A desirable apparatus will typically include at least one extruder, and may include a gear pump to maintain melt pressure within the apparatus. The extruder is coupled to at least one die block, or array die, such that the melt from the extruder can be transferred to the die block. In the present case, the apparatus has at least one die having multiple nozzles, each fluidly connected to its own extruder to allow different materials to be meltspun through the nozzles and/or allow spinning of the melt at different throughputs. In another arrangement, there may be more than one array die, each die coupled to an extruder and/or capable of spinning the melt at different throughputs. The array die includes a spinneret portion and is coupled also to at least one air manifold for delivering high pressure air to the spinneret portion of the die. The spinneret includes a plurality of spinning nozzles through which the melt is extruded and simultaneously attenuated with air pressure to form filaments, or fibers.

The meltspun fibers that form one or more layers of the BELs herein are formed by extruding the molten copolymer through a plurality of fine, usually circular, die capillaries or "spinning nozzles" as molten threads or filaments into converging or parallel, usually hot and high velocity, gas stream(s) (e.g., air or nitrogen) to attenuate the filaments of molten thermoplastic material and form fibers. During the meltspinning process, the diameters of the molten filaments are typically reduced by the drawing air to a desired size. Thereafter, the meltblown fibers are carried by the high velocity gas stream and are deposited on a collecting surface to form at least one web of randomly disbursed meltblown fibers. The meltspun fibers may be continuous or discontinuous and are generally within the range from 0.5 to 350 μm in average diameter.

More particularly, in the meltspinning process useful for forming the elastic meltblown fabrics, molten polymer is provided to at least one array die that is disposed between a pair of air plates, one being the top plate, that form one or more primary air nozzles. In one embodiment, the meltblowing apparatus includes an array die with a plurality of spinneret nozzles (or "nozzles"), the nozzle density within the range from 20 or 30 or 40 to 200 or 250 or 320 nozzles/inch. In one embodiment, each nozzle has an inside diameter within the range from 0.05 or 0.10 or 0.20 to 0.80 or 1.00 or 2.00 mm. The air plates in one embodiment are mounted in a recessed configuration such that the tips of the spinning nozzles are set back from the primary air nozzle. In another embodiment, air plates are mounted in a flush configuration where the air plate ends are in the same horizontal plane as the tip of the spinning nozzles. In yet other embodiments, the spinning nozzle tips are in a protruding or "stick-out" configuration so that the tip of the spinning nozzles extends past the ends of the air plates. Moreover, more than one air stream can be provided for use in the spinning nozzles.

In one embodiment, hot air ("primary air") is provided through the primary air nozzle located at least on each side or around the circumference of the die tip or around each nozzle. The hot air heats the die and thus prevents the die from becoming clogged with solidifying polymer as the molten polymer exits and cools. The hot air also draws, or attenuates, the melt into fibers. The primary air may flow parallel to the forming molten filaments, or at any angle up to being perpendicular to the forming filaments, and preferably, the primary air flow is within the range from parallel (0°) to an angle of about 30 or 40°. In certain embodiments the primary air pressure in the meltblown process typically ranges from 2 or 5 to 10 or 15 or 20 or 30 pounds per square inch gauge ("psig") at a point in the die head just prior to exit. Primary air temperatures are typically within the range from 200 or 230 to 300 or 320 or 350° C. in certain embodiments, and attenuated with air at a temperature of greater than 50 or 80 or 100 or 150° C. in other embodiments. Primary air flow rates typically range from 5 or 10 or 20 to 24 or 30 or 40 standard cubic feet per minute per inch of die width ("SCFM/inch").

The melt temperature of the polymers used to make the meltspun ISLs described herein is from greater than that to form a melt of the polymer (and any other additives) and below the decomposition temperature of the polymers (and any other additives), and in certain embodiments is within the range from 50 or 100 or 150° C. to 250 or 280 or 350° C. In yet other embodiments, the melt temperature is from less than 150 or 200 or 220 or 230 or 250 or 260 or 270 or 280° C. The polymer is formed into fibers at a melt pressure from greater than 200 psi (1.38 MPa) or 500 psi (3.45 MPa) or 750 psi (5.17 MPa) or 1000 psi (6.89 MPa), or within the range from 200 psi (1.38 MPa) or 500 psi (3.45 MPa) or 750 psi (5.17 MPa) to 1000 psi (6.89 MPa) or 2000 psi (13.78 MPa) in other embodiments. Thus, the meltspinning apparatus must be able to generate and withstand such pressures to spin, for example, the low MFR (less than 80 dg/min) propylene-α-olefin elastomers into the meltspun fabrics, and BELs or ISLs comprising at least one elastic fabric as described herein.

Expressed in terms of the amount of molten polymer flowing per inch of the die per unit of time, throughputs for the manufacture of elastic meltblown fabrics using the compositions described herein are typically within the range from 0.1 or 0.2 or 0.3 to 0.5 or 1.0 or 1.25 or 2 or 3 or 5 grams per hole per minute (ghm). Thus, for a die having 30 nozzles per inch, polymer throughput is typically about 0.4 to 1.2 or 3.2 or 4 or 5 lbs/inch/hour ("PIH").

Because such high temperatures can be used, a substantial amount of heat is desirably removed from the fibers in order to quench, or solidify, the filaments leaving the spinning nozzles. Cold gases of air or nitrogen can be used to accelerate cooling and solidification of the meltspun filaments into fibers. In particular, cooling ("secondary") air flowing in a cross-flow direction (perpendicular or angled) relative to the direction of fiber elongation, may be used to quench the meltspun filaments and be used to control the diameter of the fibers formed therefrom. Also, an additional, cooler pressurized quench air may be used and can result in even faster cooling and solidification of the fibers. In certain embodiments, the secondary cold air flow may be used to attenuate the filaments in addition to or in place of the primary air. Secondary air at temperatures within the range of from 0° or 10° to 20° or 25° or 30° or 40° C. can also be provided through the die head(s) or at other desirable locations within the meltspinning apparatus. Alternatively, a water quench can also be applied to the fibers upon immediately exiting the spinning nozzles.

Through the control of air and array die temperatures, air pressure, and polymer feed rate, the diameter of the fiber formed during the meltspun process may be regulated. The final fibers that comprise the meltspun elastic fabric may have an average diameter within the range of 0.1 or 1 or 4 to 15 or 20 or 40 or 50 or 150 or 250 µm; or an average diameter of less than 40 or 20 or 15 µm in yet other embodiments; or expressed another way, a denier (g/9000 m) of less than 5.0 or 3.0 or 2.0 or 1.9 or 1.8 or 1.6 or 1.4 or 1.2 or 1.0.

After or during cooling, the meltspun fibers are collected to form a layered structure or BEL. In particular, the fibers are collected on any desirable apparatus as is known in the art such as a moving mesh screen, moving belt or collecting (smooth or patterned/embossed) drum(s) located below or across from the nozzles. In order to provide enough space beneath the spinning nozzles for fiber forming, attenuation and cooling, forming distances from 3 inches to 2 feet or more between the polymer nozzle tips and the top of the mesh screen or collecting drum are desired. In certain embodiments, the fibers of the layers are not bound to one another by a secondary process.

In any case, once formed the meltspun elastomeric fabric layer is combined with and/or bound to one or more extensible layers to form the BEL, the extensible layers comprising other fabrics, nets, coform fabrics, scrims, and/or films, any of which are prepared from natural materials, synthetic materials, or blends thereof. The materials may be extensible, elastic or plastic in certain embodiments. The extensible layers may be combined with the BELs by any means known in the art such by known fabric-fabric or fabric-film lamination techniques, contacting under heat, air pressure or water pressure to entangle and/or join the fabric (or film) layers to at least one face of the meltspun elastic fabric. In certain embodiments, the meltspun elastic fabric layer is laid directly upon another extensible and/or elastic fabric as it is moving at a desirable rate. One such method is described in U.S. Ser. No. 61/101,341, filed Sep. 30, 2008, incorporated by reference. Further methods of producing, entangling and laminating fabrics are further described by Roger Chapman, "Nonwoven Fabrics, Staple Fibers" and Bruce Barton, "Coated Fabrics" both in KIRK-OTHMER ENCYCLOPEDIA OF CHEMICAL TECHNOLOGY (John Wiley & Sons 2005 and 1993, respectively), incorporated by reference.

Non-limiting examples of materials that can be used to make one or more extensible layers are polypropylene (e.g., homopolymers, impact copolymers, random or block copolymers), polyethylene (e.g., LDPE, LLDPE, HDPE), plastomers (ethylene-α-olefin random and block copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics (e.g., cotton, Rayon™, Lyocell™, Tencil™), wood, viscose, an elastomer, and blends of any two or more of these materials. A more extensive list is described below. In any case, at least one of the layers that is adjacent to the one or more elastic layers must be a fabric such that, when fused to the elastic layer, reduces the elasticity of the fused "zone." Alternatively, if the only adjacent layer(s) is a film, it must be made from a thermoplastic material that, when fused to the elastic layer as described herein, reduces the elasticity of the fused "zone."

The extensible layer(s), sometimes referred to as "facing" layers, may be in the form of films, fabrics, or both. Films may be cast, blown, or made by any other suitable means. When the extensible layers are fabrics, the extensible layers can be meltspun, carded, dry-laid, or wet-laid fabrics, any of which may be spunlaced. The dry-laid processes include mechanical means, such as how carded fabrics are produced, and aerodynamic means, such as, air-laid methods. Dry-laid nonwovens may be made with staple fiber processing machinery such as cards and garnetts, which are designed to manipulate staple fibers in the dry state. Also included in this category are nonwovens made from fibers in the form of tow, and fabrics composed of staple fibers and stitching filaments or yarns, namely, stitchbonded nonwovens. Fabrics made by wet-laid processes made with machinery associated with pulp fiberizing, such as hammer mills, and paperforming. Web-bonding processes can be described as being chemical processes or physical processes. In any case, dry- and wet-laid fabrics can be jet and/or hydroentangled to form a spunlace fabric as is known in the art. Chemical bonding refers to the use of water-based and solvent-based polymers to bind together the fibrous webs. These binders can be applied by saturation (impregnation), spraying, printing, or application as a foam. Physical bonding processes include thermal processes such as calendering and hot air bonding, and mechanical processes such as needling and hydroentangling. Meltspun nonwovens are made in one continuous process: fibers are spun by melt extrusion and then directly dispersed into a web by deflectors or can be directed with air streams.

"Carding" may include the disentangling, cleaning, and intermixing of fibers to make a web for further processing into a nonwoven fabric and is well known in the art. The fabric is called a "carded" fabric when made using this process. The aim is to take a mass of fiber tufts and produce a uniform, clean web. An example of a method of carding is described in U.S. Pat. No. 4,105,381, incorporated by reference. The process predominantly aligns the fibers which are held together as a web by mechanical entanglement and fiber-fiber friction. The main type of card is a roller card. The carding action is the combing or working of fibers between the points of saw-tooth wire clothing on a series of interworking card rollers. Short fibers and foreign bodies are removed, the fiber tufts are opened, and the fibers are arranged more or less parallel. The carding or parallelization of fibers occurs when one of the surfaces moves at a speed greater than the other. Fibers are removed, or "stripped," when the points are arranged in the same direction and the more quickly moving surface removes or transfers the fibers from the more slowly moving surface.

High speed cards designed to produce nonwoven webs may be configured with one or more main cylinders, roller or stationary tops, one or two doffers, or various combinations of these principal components. Single-cylinder cards are usually used for products requiring machine-direction or parallel-fiber orientation. Double-cylinder cards (or "tandem" cards) are basically two single-cylinder cards linked together by a section of stripper and feed rolls to transport and feed the web from the first working area to the second. The coupling of two carding units in tandem distributes the working area and permits greater fiber throughput at web quality levels comparable to slower single-cylinder machines. Roller-top cards may have five to seven sets of workers and strippers to mix and card the fibers carried on the cylinder. The multiple transferring action and re-introduction of new groupings of fibers to the carding zones provides a doubling effect which enhances web uniformity. Stationary-top cards have strips of metallic clothing mounted on plates positioned concavely around the upper periphery of the cylinder. The additional carding surfaces thus established provide expanded fiber alignment with minimum fiber extraction.

In certain embodiments, the BELs may comprise one or more coform fabric layers. Methods for forming such fabrics are described in, for example, U.S. Pat. No. 4,818,464 and U.S. Pat. No. 5,720,832, both of which are incorporated by reference. Generally, fabrics of two or more different thermoplastic and/or elastomeric materials may be formed. For example, the coform fabrics described herein may comprise from 1 or 5 or 10 or 20 or 40 or 50 to 60 or 70 or 80 or 90 or 99 wt % of the a thermoplastic like polypropylene or an elastomer such as a propylene-α-olefin and from 99 or 90 or 80 or 70 or 60 to 50 or 40 or 20 or 10 or 5 or 1 wt % of another thermoplastic material such as another polypropylene, polyethylene, polyurethane, etc., or an elastomer such as a propylene-α-olefin elastomer or a styrenic block copolymer. Thus, in one aspect is provided the introduction of molten extruded primary material (e.g., polypropylene or an elastomer) and optionally one or more other materials (elastomeric, adsorbent, thermoplastic, etc.) to the shear layers of at least one rapidly moving stream or jet of an inert gas from two or more extrusion openings or sets of openings placed surrounding or on alternate or opposite sides of the high velocity gas delivery nozzle. The material which is extruded from these openings may be the same material or, alternatively, materials which differ from one another in their chemical and/or physical properties. Designated as first, second, etc., thermoplastic, absorbent or elastomeric material, the materials may be of the same or different chemical composition or molecular structure and, when of the same molecular structure, may differ in molecular weight or other characteristics which results in differing physical properties. In those situations in which thermoplastic materials are used which differ from one another in some respect, such as in physical properties, the extrusion or die head will be provided with multiple chambers, one for each of the thermoplastic materials, such as first, second, etc., thermoplastic materials. That is, the die head is provided with a first chamber for the first thermoplastic material and a second chamber for the second thermoplastic material, etc. In contrast, such an arrangement where a single chamber is provided with conduits or passages which provide communication between the single chamber and each of the first and the second thermoplastic extrusion outlet openings, when a first chamber and a second chamber are employed for first and second thermoplastic materials, respectively, each chamber is provided with passages to only one extrusion outlet opening or set of openings. Thus, the first thermoplastic material chamber communicates with the first extrusion outlet opening by means of the first thermoplastic material passage, while the second thermoplastic material chamber communicates with the second thermoplastic extrusion opening through the second thermoplastic and/or elastomeric material passage.

The two or more various layers of fabrics and/or films that make up the BELs or constrained BELs described herein may be merely adjacent to one another without being bound, or one or more layers may be bound together in some manner. As used herein, "bound" (or "bond", "adhere" or "adhered") means that two or more fabrics, or a plurality of fibers, is secured to one another through 1) the inherent tendency of the molten or non-molten materials' ability to adhere through chemical interactions and/or 2) the ability of the molten or non-molten fibers and/or fabric to entangle with the fibers comprising another material to generate a linkage between the fabrics, wherein the elasticity of any elastic fabric layer is reduced by no more than 20% relative to that fabric's initial elasticity. This bonding or adherence of adjacent fabric and/or film layers of the BELs or constricted BELs is in distinction to the "fusing" of the layers of the constricted BEL which forms an inelastic zone. The layers of the BELs described herein may be bonded to one another by known methods including heat bonding methods such as hot embossing, spot bonding, calendering, and ultrasonic bonding; mechanical entangling methods such as needle punching and hydroentanglement; use of adhesives such as hot melt adhesives and urethane adhesives; and extrusion lamination. Adhesives may be used to facilitate bonding of fabric and/or film layers, but in a particular embodiment, adhesives are absent from the fabric and/or film layers (not used to bond the fibers of a fabric) described herein; and in another embodiment, absent from the BELs or constrained BELs (not used to bond adjacent fabric layers) described herein.

The BELs can have any number of properties as defined in part by its bulk properties, or those of the fibers that make up the fabrics therein. In certain embodiments, fibers comprising the extensible (or "facing") layers described herein have an average diameter of greater than 4 or 6 or 8 or 10 or 12 μm, and in other embodiments have an average diameter from less than 80 or 50 or 40 or 30 or 20 or 10 or 5 μm. In yet another embodiment, the fibers that make up the extensible fabric layers of the BELs have an average diameter within the range from 5 or 6 or 8 or 10 to 20 or 50 or 80 or 100 or 150 or 200 or 250 or 350 or 1000 μm. The BELs or constrained BELs may have a basis weight in the range from 5 or 10 or 15 or 20 $g/m^2$ to 25 or 30 or 40 or 50 or 60 or 100 $g/m^2$ in certain embodiments.

Any layer of the constrained BELs, whether fabric or film, may include one or more additives. The additives may be present at any desirable level, examples of which include from 0.0005 or 0.01 or 0.1 to 3 or 4 or 5 or 10 wt %, by weight of the fiber or fabric or film. As used herein, "additives" include, for example, stabilizers, surfactants, antioxidants, anti-ozonants (e.g., thioureas), fillers, migrating (preventative) agent, colorants, nucleating agents, anti-block agents, UV-blockers/absorbers, hydrocarbon resins (e.g., Oppera™ resins, Picolyte™ tackifiers, polyisobutylenes, etc.) and other tackifiers, oils (e.g., paraffinic, mineral, aromatic, synthetic), slip additives, hydrophilic additives (e.g., Irgasurf™ 560 HL), hydrophobic additives (e.g., wax) and combinations thereof. Primary and secondary antioxidants include, for example, hindered phenols, hindered amines, and phosphates. Slip agents include, for example, oleamide and erucamide. Examples of fillers include carbon black, clay, talc, calcium carbonate, mica, silica, silicate, and combinations thereof. Other additives include dispersing agents and catalyst deactivators such as calcium stearate, hydrotalcite, and calcium oxide, and/or other acid neutralizers known in the art. The additives may be added to the materials that make up the various layers of the constrained BELs by any means such as by dry blending the additive with pellets of the pure polymer material prior to meltspinning, or by obtaining the fabric material already possessing the additive(s).

Constraining Process and Constrained BELs Therefrom

The BELs produced by any suitable means are then subjected to a fusing step by way of subjecting the layered structure to a constraining means to form a constrained BEL. In certain embodiments, one or more, or all, of the layers of the BEL are not adhered to one another but are merely adjacent to one another. In other embodiments, at least two layers, or all the layers, of the BEL are adhered to one another. A "constraining means" is any device, substance or process that is capable of fusing at least a portion of the at least one meltspun elastic fabric to at least one of the extensible fabrics to create at least one inelastic zone. The process of "fusing" creates an area on the BEL that is no longer "elastic," and may comprise fusing one adjacent layer to the elastic layer(s), or substantially (at least 90%) fusing all of the layers, up to the fusing of all layers throughout the full thickness (all layers) of the BEL. In certain embodiments, fusing discrete zones of the at least one meltspun elastic fabric to at least one of the extensible fabrics creates zones that possess an elasticity that is at least 40% or 50% or 60% or 70% or 80% or 90% or 98% less elastic relative to the initial elasticity of the meltspun elastic fabric. The fusing of a BEL creates the constrained BEL.

Described herein is a method of imparting constraint in a biaxially elastic nonwoven laminate comprising providing a biaxially elastic nonwoven laminate comprising at least one meltspun elastic fabric and at least one extensible fabric or film; and fusing at least a portion of the at least one meltspun elastic fabric to at least one of the extensible fabrics to create at least one inelastic zone. The fusing may be achieved by any means such as by heating the layers to form an adherence between at least two layers, or hydroentangling at least two of the layers, or ultrasonic means, electronic means, or other suitable means for adhering the layers to one another. Adhesives may be used in fusing, but in certain embodiments, the application of adhesives is absent from the fusing step. Examples of adhesives include those comprising low weight average molecular weight (<80,000 g/mole) polyolefins, polyvinyl acetate polyamide, hydrocarbon resins, natural asphalts, styrenic rubbers, polyisoprene and blends thereof.

By referring to the "inelastic zone" created by the fusing step as "inelastic," what is meant is that its elasticity is less than that defined above for a material that is "elastic." The inelastic zone may take on any "discrete" shape or form suitable to the desired end use, such as a diaper or adult incontinence garment. For example, the inelastic zones may take the form of a long line or block having a length that is at least twice or three times its width. In some embodiments the inelastic zone defines an area of irregular shape, or non-linear shape such as a circle, arc or shapes comprising such features.

In a specific embodiment the fusing comprises calendering the biaxially elastic nonwoven laminate to melt at least a portion of the meltspun elastic fabric and create an fusion of the one or more elastic fabrics to at least one extensible fabric. In a particular embodiment, the fusing step is carried out by means of a calender with raised heated zoning patterns. In certain embodiments, the fusing further introduces an embossed pattern in the laminate. The fusing and embossing step may be carried out by means of a calender with intermeshing rolls that are optionally heated. Also, the fusing and embossing step may be carried out by means of patterned intermeshing vacuum drums running under a vacuum differential, or other suitable means.

In certain embodiments, the fusing is performed such that a degree of elasticity is maintained in the CD of the BEL, the MD of the BEL, or some degree there between and/or combination thereof. For example, the fusing may be such that the BEL is only elastic in the CD direction, or 45° from the CD direction, or 20° from the CD direction, or in the range of from 90° to 20° or 45°, etc. Also, the elasticity in the constrained BEL may be such that both CD and MD elasticity is reduced but not complete removed. In a specific embodiment, at least one portion of the bound fabric layers are fused in discrete zones that are parallel to the CD of the biaxially elastic laminate, parallel to the MD of the biaxially elastic laminate, or at some orientation there between.

In certain embodiments the laminate has a CD width and an inelastic zone running perpendicular to the CD of the laminate, the inelastic zone having a CD width of at least 2 or 5 or 10 or 20% of the CD width of the laminate. In yet other embodiments the laminate has a CD width and an inelastic zone running perpendicular to the MD of the laminate, the inelastic zone having a MD width of at least 2 or 5 or 10 or 20% of the CD width of the laminate.

The BEL that is constrained can take on any suitable form. It may have more than one elastic meltspun fabric layer, as well as multiple extensible fabric and/or film layers. Some of the layers may be formed by any suitable means such as meltspun, dry-laid, carded, textile weaving, or wet-laid means. In a particular embodiment, at least one elastic layer is a meltblown fabric, and in a more particular embodiment is the meltblown fabric comprises or consists essentially of a propylene-α-olefin elastomer. In a particular embodiment, the biaxially elastic nonwoven laminate is an ISL as referred to above. In a particular embodiment, the ISL is formed by a method comprising simultaneously meltspinning two or more polymer melts adjacent to one another to form adjacent fabrics, wherein fabric layers that are adjacent to one another are in situ entangled with one another to form an interfacial region of mixed fibers between the fabric layers.

The BELs used to form the constrained fabrics, or the constrained BEL's themselves, may include in situ laminates that comprise structures selected from TE, TET, $T_{bl}$ET, $T_{bl}$ET$_{bl}$, $T_{bl}$E$_{bl}$T$_{bl}$, T°$_{bl}$E$_{bl}$T$_{bl}$, TEC, CEC°, TCET, TTE, TEE, TE°EE°T, E°EE°, E°$_{bl}$EE°$_{bl}$, CECT, CETT, TTETT, TT°E-T°T, TCECT, TE°ET, TEET, TE$_{bl}$ET, TCE, T°ET, T°ET$_{bl}$, T°CET, TEE°, $T_{bl}$E$_{bl}$C, T°$_{bl}$E$_{bl}$CT, TE°T, TE$_{bl}$C, T°EC°T, $T_{bl}$E, $T_{bl}$E$_{bl}$, $T_{bl}$ET, $T_{bl}$EC, $T_{bl}$ET, TE$_{bl}$, TEC$_{bl}$, TE$_{bl}$T, TE$_{bl}$C, TEC$_{bl}$T, TTE, TCCE, TTETT, TTECC, TTETT, $T_{bl}$TETT$_{bl}$, TT°E, TT°C, T°ETT, TECC, T°$_{bl}$CET$_{bl}$, TEE°, TC$_{bl}$EC°, TEE°T, TEE°C, TT°ET°T, TT$_{bl}$E, TT$_{bl}$EC, T$_{bl}$CE$_{bl}$T, T$_{bl}$ET, T°$_{bl}$ET, T$_{bl}$EEC, T$_{bl}$CET, TE$_{bl}$, TET°C$_{bl}$, TEE$_{bl}$C, TE$_{bl}$CT°, TC$_{bl}$EC$_{bl}$, TC°ECT, TC$_{bl}$ECT and variants thereof, wherein "T" is a fabric comprising a first thermoplastic, "T°" is a fabric comprising the first thermoplastic having distinct physical property(ies) from "T", "C" is a fabric comprising a second thermoplastic that is different than the first thermoplastic, "C°" is a fabric comprising the second thermoplastic having distinct physical property(ies) from "C", "E" is a fabric comprising an elastomer, "E°" is a fabric comprising an elastomer having distinct physical property(ies) from "E", and the subscript "bl" refers to fabrics that comprise a blend of thermoplastics, elastomers, or both. As referred to above, "physical" properties are those such as the basis weight of the fabric, the fiber density, the fiber diameter that formed the fabric(s), the pore size of the fabric(s), its air permeability, its hydrohead, abrasion resistance, degree of softness ("Hand"), and other such properties.

The one or more elastic fabric layers of the BEL or constrained BEL can be made from any one or more of the elastomers discussed above, or a blend of an elastomer and a thermoplastic or other material such as is used to make at least one of the extensible layers. The elastic fabric layer is bound to at least one extensible layer, and more particularly, the two layers directly adjacent to and sandwiching the elastic layer. In certain embodiments all of the fabric and/or film layers of the constrained BEL are fused to one another. In certain embodiments, the extensible fabric layer(s) comprise a material selected from the group consisting of polypropylene, polyethylene, functionalized polyolefins, plastomers (ethylene-α-olefin random copolymers of density typically less than 0.90 g/cm$^3$), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics, elastomers (as described above), poly(acetylene), poly(thiophene), poly(aniline), poly(fluorene), poly(pyrrole), poly(3-alkylthiophene), poly(phenylene sulfide), polynaphthalenes, poly(phenylene vinylene), poly(vinylidene fluoride), ethylene-α-olefin block copolymers, wood, viscose, cotton, and blends of any two or more of these materials. As mentioned, the elastic meltspun fabric layer may include any thermoplastic or any one of the above materials that can be meltspun or otherwise included in the meltspun elastic fabric such as by a coform process, etc.

In a particular embodiment, the BEL or constrained BEL comprises two or more facing fabric layers comprising a blend of any two or more types of fibers comprising polypropylene, polyethylene terephthalate, viscose, cotton, and an elastic fabric there between comprising a propylene-α-olefin elastomer. In another particular embodiment the BEL or constrained BEL comprises two or more facing fabric layers comprising polypropylene, polyethylene terephthalate, or a blend of both, and an elastic fabric there between comprising a propylene-α-olefin elastomer.

The fusing step creates "inelastic zones" as described herein. In certain embodiments, the fusing creates at least three inelastic zones along the width and parallel to the MD of the biaxially elastic nonwoven laminate such as to impart CD elasticity in the laminate, wherein two of the inelastic zones run along the edge of the laminate and one inelastic zone runs down the middle of the laminate. In other embodiment, larger areas at either side of the web undergo the fusing step to create larger inelastic regions to act as deadzones for hook attachment and sites that allow for bonding of the component to the absorbent garment chassis (e.g., adult incontinence garment or baby diaper). These zones are more resistant to creep and shear and prevent hook delamination and pulling of the elastic component away from the diaper chassis.

The constrained BEL produced as described above may take on any form that includes the at least one meltspun elastic fabric and at least one extensible fabric. In one aspect is proved herein a constrained biaxially elastic nonwoven laminate comprising at least one meltspun elastic fabric and at least one extensible fabric or film, wherein at least one portion of the fabric layers are fused to one another in discrete zones that are parallel to the CD of the biaxially elastic laminate, parallel to the MD of the biaxially elastic laminate, or at some orientation there between. Specific embodiments of the constrained BELs are shown in the representations of FIGS. 1 to 3.

Figure 1B:
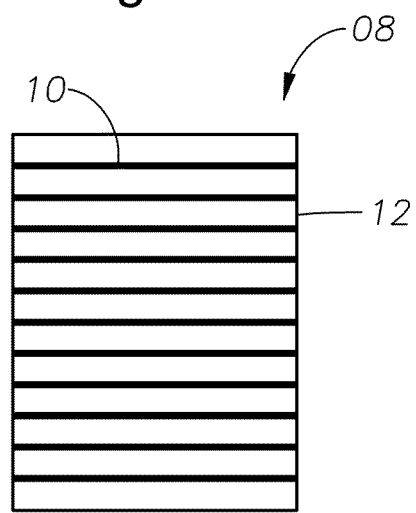
FIG. 1b is a representation of one embodiment of a constrained biaxially elastic nonwoven laminate having inelastic zones in the form of lines of desirable width running continuously in the CD direction, the representation viewed from above.

FIG. 1a is a representation of the top view of a constrained BEL or constrained BEL segment 02 having inelastic zones 04 and elastic zones 06, both running parallel to the MD. This construction, for example, would create a layered fabric that is elastic in the CD and inelastic in the MD. FIG. 1b is a representation of the top view of a constrained BEL or constrained BEL segment 08 having inelastic zones 10 and elastic zones 12, both running parallel to the CD. This construction, for example, would create a layered fabric that is elastic in the MD and inelastic in the CD. Such inelastic zones can take any other form, such as partial lines running parallel to the CD or MD, inelastic zones that are at an angle to the CD and/or MD, or any other desirable form.

In certain embodiments, the constrained BEL has a CD width and at least one inelastic zone running perpendicular to the CD of the laminate, the inelastic zone(s) having a CD width within the range from 2 or 3 or 4 or 5 to 10 or 20 or 30% of the CD width of the laminate, and greater than 2 or 5 or 10% in another embodiment. Likewise, in certain embodiments the constrained BEL has a CD width and at least one inelastic zone running perpendicular to the MD of the laminate, the inelastic zone(s) having a MD width within the range from 2 or 3 or 4 or 5 to 10 or 20 or 30% of the CD width of the laminate, and greater than 2 or 5 or 10% in another embodiment. There may be only one zone, or two or three or four or more zones. The zones may be the same or different from one another, and may be parallel or at angles to one another.

Figure 2A:
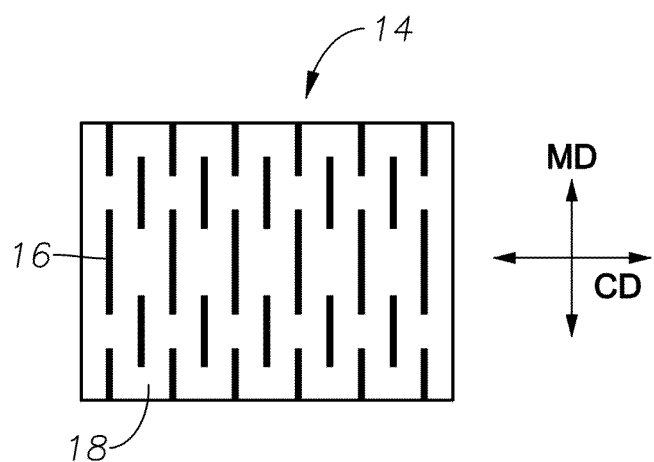
FIG. 2a is a representation of one embodiment of a constrained biaxially elastic nonwoven laminate having inelastic zones in the form of broken or discontinuous lines of desirable width running continuously parallel to the MD direction, the representation viewed from above.
Figure 2B:
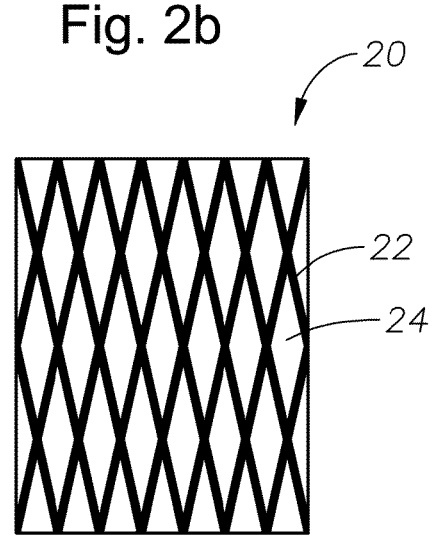
FIG. 2b is a representation of one embodiment of a constrained biaxially elastic nonwoven laminate having inelastic zones in the form of lines of desirable width running continuously in the at an angle relative to the MD direction, the representation viewed from above.
Figure 3:
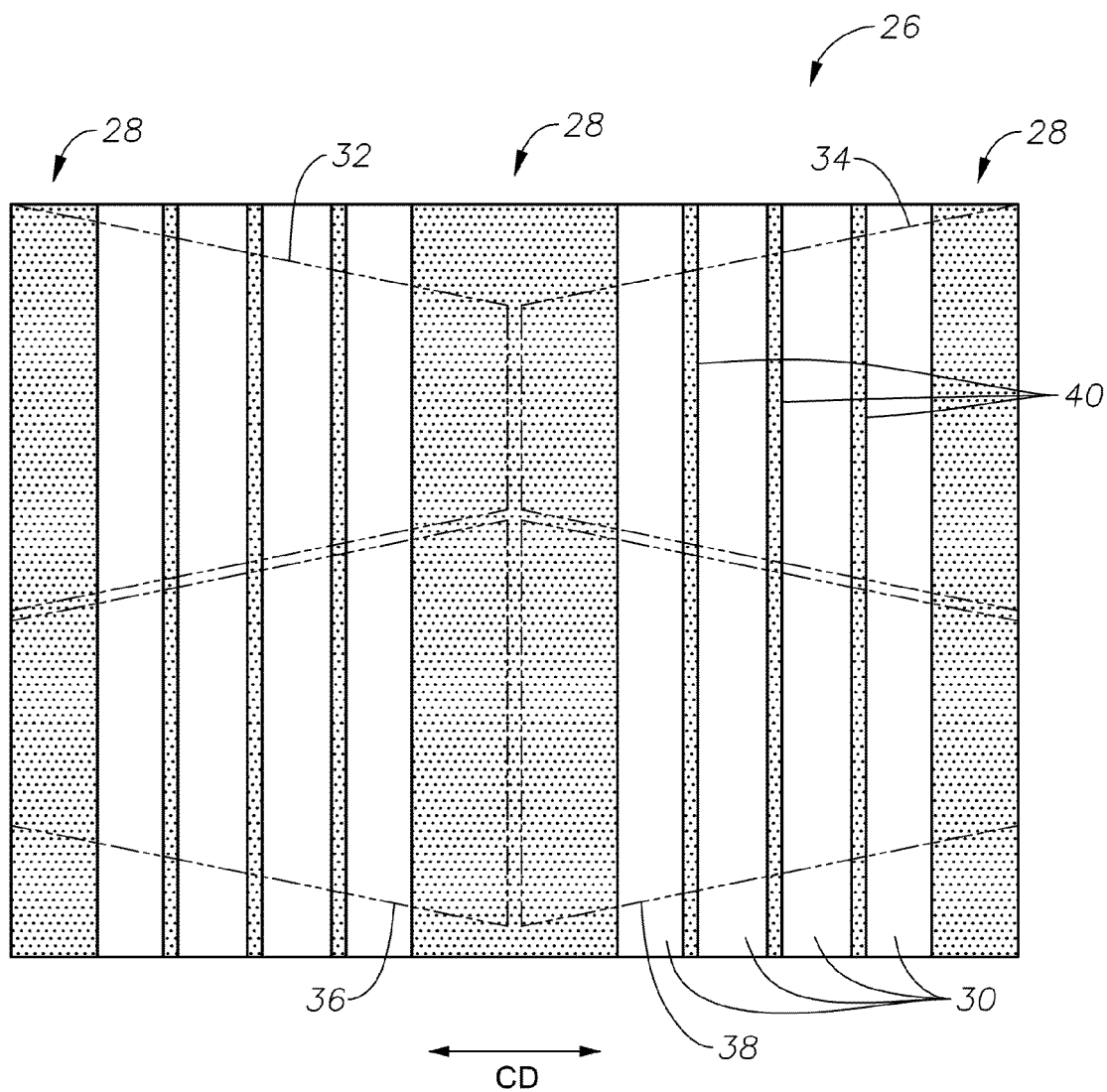
FIG. 3 is a representation of a complex constrained biaxially elastic nonwoven laminate having inelastic zones of varying width such as to define tab and backsheet portions of an end use article that might be cut at least partially from the trapezoidal zones described in the figure, the representation viewed from above.

For example, shown in FIG. 2a is a representation of the top view of a constrained BEL 14 having broken parallel lines 16 of inelastic zones parallel to the MD, the remainder being elastic areas 18 (non-bound zones). This structure might impart a partial elasticity of the constrained BEL in the MD direction and complete elasticity in the CD direction. As another example of a constrained BEL, shown in FIG. 2b is a structure having straight lines 22 at an angle relative to the MD creating inelastic zones, the elastic portions 24 being in the shape of elongated diamonds. This structure might be partially constrained in both the MD and CD directions, perhaps more so in the MD direction. The angle of the lines or zones 22 may be increased to make the fabric more constrained in the CD.

The constrained BELs, especially those that comprise in situ laminates, may take on more complex designs to accommodate the production of specific articles such as diapers and incontinence garments. An example of a more complex constrained BEL 26 is shown in the representation of FIG. 3. The constrained BEL 26 comprises inelastic zones 28 and 40 running parallel to the MD. The zones may be of different forms or, in this case, widths. The width of the inelastic zones 28 are larger than the width of zones 40, leaving variable widths of elastic zones 30. Such structures as 26 can form a template for a diaper. For example, from any one of areas 32, 34, 36 and 38 (trapezoidal shapes) shown by the broken lines in FIG. 3 can be cut a diaper or portion of a diaper including a hook region (middle inelastic zone 28 of structure 26) and a backsheet attachment region (edge of 26). The inelastic zones 04, 10, 16 and 28 in FIGS. 1-3 can take any desirable width. In certain embodiments, the width is within the range from 1 or 2 or 3 to 5 or 10 or 20 or 30 mm, and greater than 1 or 2 or 3 or 10 or 20 or 50 or 100 mm in other embodiments.

FIG. 3 shows how a CD-stretch only fabric, such as one used in a diaper ear and/or wing, might look with deadzones calendared into the fabric. The trapezoidal shapes are meant to represent a diaper ear/wing and how it could be die cut from the fabric roll such that you have a inelastic zone or "deadzone" at either end of the ear for the attachment to the backsheet of the diaper as well as for the attachment of the hook fastening system, while still maintaining a CD stretch only configuration in the middle of the ear or wing.

The specific spacing for the deadzones would depend upon the specific customer requirements. From a fabric production perspective the most convenient approach would be to have the customer form the deadzone through a calendaring process as the fabric enters their diaper converting machine. Alternatively, the fabric producer could create a standard CD-only elastic fabric which is slit to the customer's requirements. It could be designed such that a calendaring process is integrated into the slitting process so as to create the deadzones as the fabric is slit. This would then allow for the necessary customization of the elastic fabric for the range of end-uses, sizes and designs.

The BEL or constrained BEL described herein may take on any of a number of layered structures that may include those made from in situ lamination processes or traditional lamination processes or other means of creating layered structures. Thus, the BEL or constrained BEL may be further characterized in that the at least one elastic fabric layer, designated "E", is combined with one or more extensible layers of fabric or film to form the laminate, the laminate being selected from structures consisting of ME, MEM, EE, EEE, EEEE, EEM, MMEMM, MMEM, EME, EMME, EEMEE, EMMEE, EMEEE, EEMMEE, EMEME, EEEMEE, SE, SES, SEM, SEES, SEEES, SSESS, SSES, SSEES, SSEEES, EE, EEE, EEEE, DEEEE, MEEEE, SEEEE, EES, ESE, ESSE, EESEE, ESSEE, ESEEE, EESSEE, ESESE, EEESEE, DE, DDE, DED, DEE, DDDDE, EED, EDE, EDDE, EEDEE, EDDEE, EEDDEE, DME, DDMEE, EDMDE, DEMED, DDEMED, DDEMEDD, DDEMMEDD, DEMMED, EDMDMD, EMDME, EDMMDD, EEDMDEE, DDDDME, EEDM-
MDEE, FE, MEF, FEE, FEF, SEF, DEF, WEF, FEEE,
FEEEE, FEEF, FEFEF, FEEM, EFE, EMFE, EEFEE,
EFFEE, EMFEE, EEMFEE, EFD, EDFD, EDDFFD,
EDFDD, DEF, DFE, DDDFE, FDE, EDDF, EFDEE, FED-
DEE, EFDDEE, DMEF, DFMEE, EDFDE, DEFED, DDE-
FED, DDEFEDD, DDEFFEDD, DEFFED, EFDFD,
EFDFE, SFME, SSFME, EFFE, TxE, TxSD, TxSW, TxMTx,
TxSMSTx, TxETx, TxTxETxTx, ETxE, WE, WEW, EWE,
EA, EAE, AEA, TxEETx, TxSESTx, DTxETxD, WTx-
ETxD. WSESW, DSESD, ETxTxE, ETxETxE, WTxETxW,
WWEWW, WEEW, WSESW, WEAAEW, SEAAES, EATx,
EAW, SEAWES, DEAED, SWEWS, wherein "M" represents
meltblown fabric layers, "S" represents spunbond fabric layers, "F" represents film layers, "D" represents dry-laid (carded, air-laid) fabric layers, "Tx" represents textile-type of fabrics, "W" represents woven fabrics, and "A" represents absorbent (pulp, paper, super-absorbent materials, etc) fabrics. Any of the layers may be made from materials or blends of materials as described herein for the elastic layer(s) and the extensible layer(s).

Bicomponent Fibers

In certain embodiments, the fibers used to form any one or all of the constrained BELs are bicomponent or "conjugate" fibers. These include structures that are side-by-side, segmented, sheath/core, island-in-the-sea structures ("matrix fibril"), and others as is known in the art. Thus, a bicomponent fiber is one that has a cross-sectional morphology that is at least bi-phasic in varying geometries. In certain embodiments, at least one of the polymers used to make the fiber is a propylene-α-olefin elastomer. The second, third, etc. component of the conjugate fiber may be made from any suitable materials such as polypropylene, polyethylene (e.g., LDPE, LLDPE, HDPE), plastomers (e.g., ethylene-α-olefin copolymers), polyurethane, polyesters such as polyethylene terephthanlate, polylactic acid, polyvinyl chloride, polytetrafluoroethylene, styrenic block copolymers, propylene-α-olefin elastomers (e.g., Vistamaxx™ Specialty Elastomers), ethylene-α-olefin elastomers (e.g., Infuse™ elastomers), ethylene vinyl acetate copolymers, polyamide, polycarbonate, cellulosics (e.g., cotton, Rayon™, Lyocell™, Tencil™), wood, viscose, and blends of any two or more of these materials. A particularly preferred second (or third, etc.) component is a polyethylene. The main objective of producing bicomponent fibers is to exploit capabilities not existing in either polymer alone. By this technique, it is possible to produce fibers of any cross sectional shape or geometry that can be imagined. Side-by-side fibers are generally used as self-crimping fibers. There are several systems used to obtain a self-crimping fiber. One of them is based on different shrinkage characteristics of each component. There have been attempts to produce self-crimping fibers based on different electrometric properties of the components. Some types of side-by-side fibers crimp spontaneously as the drawing tension is removed and others have "latent crimp", appearing when certain ambient conditions are obtained. In some embodiments "reversible" and "non-reversible" crimps are used, when reversible crimp can be eliminated as the fiber is immersed in water and reappears when the fiber is dried. This phenomenon is based on swelling characteristics of the components. Different melting points on the sides of the fiber are taken advantage of when fibers are used as bonding fibers in thermally bonded non-woven webs.

Sheath-core bicomponent fibers are those fibers where one of the components (core) is substantially (at least by 90%) or fully surrounded by the second component (sheath). In certain embodiments, the fibers of one or more of the layers of the constrained BELs are bicomponent. Adhesion is not always essential for fiber integrity. The most common way of production of sheath-core fibers is a technique where two polymer liquids are separately led to a position very close to the spinneret orifices and then extruded in sheath-core form. In the case of concentric fibers, the orifice supplying the "core" polymer is in the center of the spinning orifice outlet and flow conditions of core polymer fluid are controlled to maintain the concentricity of both components when spinning Eccentric fiber production is based on several approaches: eccentric positioning of the inner polymer channel and controlling of the supply rates of the two component polymers; introducing a varying element near the supply of the sheath component melt; introducing a stream of single component merging with concentric sheath-core component just before emerging from the orifice; and deformation of spun concentric fiber by passing it over a hot edge. Matrix fibril fibers are spun from the mixture of two polymers in the required proportion; where one polymer is suspended in droplet form in the second melt. A feature in the production of matrix-fibril fibers is the desirability of artificial cooling of the fiber immediately below the spinneret orifices. Different spinnability of the two components would almost disable the spinnability of the mixture, except for low concentration mixtures (less than 20%). Bicomponent fibers are used to make fabrics that go into such products as diapers, feminine care, and adult incontinence products as top sheet, back sheet, leg cuffs, elastic waistband, transfer layers; air-laid nonwoven structures are used as absorbent cores in wet wipes; and used in spun laced nonwoven products like medical disposable textiles, and filtration products.

Also in certain embodiments any one or all of the constrained BELs layers may be a mixed-fiber fabric comprising propylene-based fibers. Mixed-fiber fabrics are disclosed in, for example, U.S. 2008/0038982, incorporated by reference. There can be one, two or more other types of fibers with the propylene-based fibers that include fibers made from polypropylene, polyethylene, plastomers, polyurethane, polyesters such as polyethylene terephthalate, polylactic acid, polyvinyl chloride, polytetrafluoroethylene, styrenic block copolymers, propylene-α-olefin elastomers (e.g., Vistamaxx™ Specialty Elastomers) or other elastomers as described herein, ethylene vinyl acetate copolymers, polyamide, polycarbonate, cellulosics (e.g., cotton, Rayon™, Lyocell™, Tencil™), wood, viscose, and blends of any two or more of these materials.

Other Post-Spinning Treatments

While the constrained BELs need no further mechanical stretching, they may nonetheless be subjected to other post-spinning, post-lamination and/or post-fusing processes. Various additional processing and/or finishing steps are known in the art, such as slitting, chemically treating, printing graphics, etc., may be performed without departing from the spirit and scope of the invention. For instance, the constrained BELs may optionally be mechanically stretched in the cross-machine direction ("CD") and/or machine directions ("MD") to enhance loft, feel and extensibility.

In one particular embodiment, the constrained BELs may be coursed through two or more rolls that have grooves in the CD and/or MD directions. Such grooved satellite/anvil roll arrangements are described in U.S. 2004/0110442 and U.S. 2006/0151914 and U.S. Pat. No. 5,914,084, each of which is incorporated by reference. The grooved rolls may be constructed of steel or other hard material (such as a hard rubber). If desired, heat may be applied by any suitable method known in the art, such as heated air, infrared heaters, heated nipped rolls, or partial wrapping of the constrained BELs around one or more heated rolls or steam canisters, etc. Heat may also be applied to the grooved rolls themselves. It should also be understood that other grooved roll arrangement are equally suitable, such as two grooved rolls positioned immediately adjacent to one another.

Besides grooved rolls, other techniques may also be used to mechanically stretch the composite in one or more directions. For example, self centering intermeshing discs are described in U.S. Pat. No. 4,223,059, U.S. Pat. No. 4,285,100 and U.S. Pat. No. 4,368,565, each of which is incorporated by reference, that can mechanically stretch a nonwoven web in MD and/or CD. Such a process uses grooved rollers comprised of discs of one diameter and discs of another diameter mounted on a shaft in a manner to permit a continuous self-centering action thereof. In a preferred embodiment, the discs are alternately mounted on the shaft. In another embodiment, two of such grooved rollers are placed in interdigitating or intermeshing relationship together with means to control the velocity of introduction of a substrate into the nip of such intermeshing grooved rollers substantially identical to the surface velocity thereof to thereby laterally stretch incremental portions of the substrate. Such a process is particularly useful for fabrics made from longer and not prone to tearing when stretched, but will undergo molecular orientation.

In another example, the composite may be passed through a tenter frame that stretches the composite. Such tenter frames are well known in the art and described, for instance, in U.S. 2004/0121687, incorporated by reference. While typically not necessary for the BEL or constrained BELs described herein, this process may nonetheless be performed as desired.

The joining or bonding of the various layers of a multi-layer structure such as the constrained BELs and/or the constrained BELs can be done such that additional CD and/or MD orientation is imparted into the constrained BELs. Many approaches may be taken to form a multi-layered structure comprising an elastomeric film and/or fabric layer which remains elastomeric once the layers are bonded together. One approach is to fold, corrugate, crepe, or otherwise gather the fabric layer prior to bonding it to the elastomeric film. The gathered fabric is bonded to the film at specified points or lines, not continually across the surface of the film. While the film/fabric is in a relaxed state, the fabric remains corrugated or puckered on the film; once the elastomeric film is stretched, the fabric layer flattens out until the puckered material is essentially flat, at which point the elastomer stretching ceases.

Another approach to impart CD and/or MD stretch is to stretch the elastomeric film/fabric, then bond the fabric to the film while the film is stretched. Again, the fabric is bonded to the film at specified points or lines rather than continually across the surface of the film. When the stretched film is allowed to relax, the fabric corrugates or puckers over the unstretched elastomeric film. While typically not necessary for the BEL or constrained BELs described herein, this process may nonetheless be performed as desired.

Yet another approach is to "neck" the fabric prior to bonding it to the elastomer layer as described in U.S. Pat. No. 5,336,545, U.S. Pat. No. 5,226,992, U.S. Pat. No. 4,981,747 and U.S. Pat. No. 4,965,122, each of which is incorporated by reference. Necking is a process by which the fabric is pulled in one direction, which causes the fibers in the fabric to slide closer together, and the width of the fabric in the direction perpendicular to the pulling direction is reduced. If the necked fabric is point-bonded to an elastomeric layer of film or fabric, the resulting layered structure will stretch somewhat in a direction perpendicular to the direction in which the fabric was pulled during the necking process, because the fibers of the necked fabric can slide away from one another as the layered structure stretches. While typically not necessary for the BEL or constrained BELs described herein, this process may nonetheless be performed as desired.

Yet another approach is to activate the elastomeric multi-layered structure once it has been formed. Activation is a process by which the elastomeric layered structure is rendered easy to stretch. Most often, activation is a physical treatment, modification or deformation of the elastomeric layered structure, said activation being performed by mechanical means. For example, the elastomeric layered structure may be incrementally stretched by using intermeshing rollers, as discussed in U.S. Pat. No. 5,422,172, and U.S. 2007/0197117, both of which are incorporated by reference, to render the layered structure stretchable and recoverable. Finally, the elastomeric film or fabric may be such that it needs no activation and is simply formed onto and/or bound to an extensible layer to form an elastic layered structure. Such processes can also be used on non-elastomeric layered structures to improve other properties such as drape and softness.

In certain embodiments, the facing layers are intrinsically non-elastic such that when incorporated in the constrained BELs, the facing layers are non-constraining and extensible without any mechanical stretching. Such is the case, for example when an elastic fabric layer made from propylene-α-olefin elastomers is sandwiched between two layers of an extensible polypropylene or polypropylene/PET spunlace fabric.

Articles

Any number of useful absorbent or barrier products can be made using the constrained BELs described herein. Non-limiting examples of useful articles include personal care products, baby diapers, training pants, absorbent underpads, swim wear, wipes, feminine hygiene products, bandages, wound care products, medical garments, surgical gowns, filters, adult incontinence products, surgical drapes, coverings, garments, protective apparel, clothing apparel, or cleaning articles and apparatus. Due to an optional embossing step in making these articles, any of these articles may have a shaped and/or patterned embossing for functional and/or aesthetic purposes. The embossment may comprise a portion or all of the inelastic zones.

In one embodiment, the absorbent article is a disposable diaper as disclosed in, for example, U.S. 2008/0119102, incorporated by reference. Such a diaper generally defines a front waist section, a rear waist section, and an intermediate section that interconnects the front and rear waist sections. Adult incontinence garments will typically take on a similar form, but with some distinct zones of elasticity and inelasticity (or "deadzones"). The front and rear waist sections include the general portions of the diaper which are constructed to extend substantially over the wearer's front and rear abdominal regions, respectively, during use. The intermediate section of the diaper includes the general portion of the diaper that is constructed to extend through the wearer's crotch region between the legs. Thus, the intermediate section is an area where repeated liquid surges typically occur in the diaper. Any one or more of these structures, for example, may comprise the constrained BELs described herein.

The diaper includes, without limitation, an outer cover, or backsheet, a liquid permeable bodyside liner, or topsheet, positioned in facing relation with the backsheet, and an absorbent core body, or liquid retention structure, such as an absorbent pad, which is located between the backsheet and the topsheet. Any one or more of these structures, for example, may comprise the constrained BELs described herein. The backsheet defines a length, or longitudinal direction, and a width or lateral direction, which coincide with the length and width of the diaper. The liquid retention structure generally has a length and width that are less than the length and width of the backsheet, respectively. Thus, marginal portions of the diaper, such as marginal sections of the backsheet may extend past the terminal edges of the liquid retention structure. In certain embodiments, the backsheet extends outwardly beyond the terminal marginal edges of the liquid retention structure to form side margins and end margins of the diaper. The topsheet is generally coextensive with the backsheet but may optionally cover an area that is larger or smaller than the area of the backsheet, as desired.

To provide an improved fit and to help reduce leakage of body exudates from the diaper, the diaper side margins and end margins may be elasticized with suitable elastic members. For example, the diaper may include leg elastics constructed to operably tension the side margins of the diaper to provide elasticized leg bands which can closely fit around the legs of the wearer to reduce leakage and provide improved comfort and appearance. Waist elastics are employed to elasticize the end margins of the diaper to provide elasticized waistbands. The waistband elastics are configured to provide a resilient, comfortably close fit around the waist of the wearer. The latently elastic materials, such as propylene-α-olefin elastomers which may form constrained BELs as described herein, are suitable for use as the leg elastics and waist elastics. Exemplary of such materials are sheets that either comprise or are fused to the backsheet, such that elastic constrictive forces are imparted to the backsheet.

As is known, fastening means, such as hook and loop fasteners, may be employed to secure the diaper on a wearer. Alternatively, other fastening means, such as buttons, pins, snaps, adhesive tape fasteners, cohesives, fabric-and-loop fasteners, or the like, may be employed. In the illustrated embodiment, the diaper includes a pair of side panels (wings or ears) to which the fasteners, indicated as the hook portion of a hook and loop fastener, are attached. Generally, the side panels are attached to the side edges of the diaper in one of the waist sections and extend laterally outward therefrom. The side panels may be elasticized or otherwise rendered elastomeric by use of latently elastic materials.

The diaper may also include a surge management layer located between the topsheet and the liquid retention structure to rapidly accept fluid exudates and distribute the fluid exudates to the liquid retention structure within the diaper. The diaper may further include a ventilation layer, also called a spacer, or spacer layer, located between the liquid retention structure and the backsheet to insulate the backsheet from the liquid retention structure to reduce the dampness of the garment at the exterior surface of a breathable outer cover, or backsheet. Any one of these structures may comprise the constrained BELs described herein.

The disposable diaper may also include a pair of containment flaps which are configured to provide a barrier to the lateral flow of body exudates. The containment flaps may be located along the laterally opposed side edges of the diaper adjacent to the side edges of the liquid retention structure. Each containment flap typically defines an unattached edge that is configured to maintain an upright, perpendicular configuration in at least the intermediate section of the diaper to form a seal against the wearer's body. The containment flaps may extend longitudinally along the entire length of the liquid retention structure or may only extend partially along the length of the liquid retention structure. When the containment flaps are shorter in length than the liquid retention structure, the containment flaps can be selectively positioned anywhere along the side edges of the diaper in the intermediate section. Such containment flaps are generally well known to those skilled in the art.

The ability to introduce MD-only elasticity in a fabric would greatly simplify the manufacturing process for such items as adult incontinence garments. A large number of such garments utilize Spandex™ yarns to produce MD stretch panels for the lower back and abdomen regions that are commonly known as "belly elastics". These fabrics can have up to 64 strands of spandex being threaded into the machine and each individual strand being glued between the polypropylene and other layers. The advantages of replacing this very complex manufacturing step with just feeding in a single roll of elastic fabric that eliminates all of the glue, the lamination process and threading of the machine would be significant—equipment simplification, higher production speeds, higher yields (lower scrap rates), reduced downtimes, among other advantages.

Having described various aspects of the BELs and constrained BELs and how they are made, described herein in numbered embodiments is:

1. A constrained biaxially elastic nonwoven laminate comprising at least one meltspun elastic fabric and at least one extensible fabric or film, wherein at least one portion of the fabric layers are fused to one another in discrete zones that are parallel to the CD of the biaxially elastic laminate, parallel to the MD of the biaxially elastic laminate, or at some orientation there between. The meltspun elastic fabric comprises, or consists essentially of, a reactor grade polyolefin-based elastomer in certain embodiments.

2. The constrained biaxially elastic nonwoven laminate of numbered embodiment 1, wherein at least one portion of the bound fabric layers are fused in discrete zones that are parallel to the CD of the biaxially elastic laminate, parallel to the MD of the biaxially elastic laminate, or at some orientation there between.

3. The constrained biaxially elastic nonwoven laminate of numbered embodiments 1 and 2, wherein the laminate has a CD width and at least one inelastic zone running perpendicular to the CD of the laminate, the inelastic zone(s) having a CD width of at least 2% of the CD width of the laminate.

4. The constrained biaxially elastic nonwoven laminate of any one of the previously numbered embodiments, wherein the laminate has a CD width and at least one inelastic zone running perpendicular to the MD of the laminate, the inelastic zone(s) having a MD width of at least 2% of the CD width of the laminate.

5. The constrained biaxially elastic nonwoven laminate of any one of the previously numbered embodiments, wherein the biaxially elastic nonwoven laminate is an in situ laminate.

6. The constrained biaxially elastic nonwoven laminate of numbered embodiment 5, comprising structures selected from TE, TET, $T_{bl}ET$, $T_{bl}ET_{bl}$, $T_{bl}E_{bl}T_{bl}$, $T°_{bl}E_{bl}T_{bl}$, TEC, CEC°, TCET, TTE, TEE, TEET, E°EE°, E°$_{bl}$EE°$_{bl}$, CECT, CETT, TTETT, TT°ET°T, TCECT, TE°ET, TE°EE°T, $TE_{bl}$ ET, TCE, T°ET, T°ET$_{bl}$, T°CET, TEE°, $T_{bl}E_{bl}C$, T°$_{bl}E_{bl}CT$, TE°T, $TE_{bl}C$, T°EC°T, $T_{bl}E$, $T_{bl}E_{bl}$, $T_{bl}ET$, $T_{bl}EC$, $T_{bl}ET$, $TE_{bl}$, $TEC_{bl}$, $TE_{bl}T$, $TE_{bl}C$, $TEC_{bl}T$, TTE, TCCE, TTETT, TTECC, TTETT, $T_{bl}TETT_{bl}$, TT°E, TT°C, T°ETT, TECC, TECC°, T°$_{bl}CET_{bl}$, TEE°, $TC_{bl}EC°$, TEE°T, TEE°C, TT°E-T°T, $TT_{bl}E$, $TT_{bl}EC$, $T_{bl}CE_{bl}T$, $T_{bl}ET$, T°$_{bl}ET$, $T_{bl}EEC$, $T_{bl}CET$, $TE_{bl}$, $TET°C_{bl}$, $TEE_{bl}C$, $TE_{bl}CT°$, $TC_{bl}EC_{bl}$, TC°-ECT, $TC_{bl}ECT$ and variants thereof, wherein "T" is a fabric comprising a first thermoplastic, "T°" is a fabric comprising the first thermoplastic having distinct physical property(ies) from "T", "C" is a fabric comprising a second thermoplastic that is different than the first thermoplastic, "C°" is a fabric comprising the second thermoplastic having distinct physical property(ies) from "C", "E" is a fabric comprising an elastomer, "E⁰" is a fabric comprising an elastomer having distinct physical property(ies) from "E", and the subscript "bl" refers to fabrics that comprise a blend of thermoplastics, elastomers, or both.

7. The constrained biaxially elastic nonwoven laminate of any one of the previously numbered embodiments, wherein adhesives are absent from between the layers.

8. The constrained biaxially elastic nonwoven laminate of any one of the previously numbered embodiments, the elastic fabric comprises an elastomer selected from the group consisting of propylene-α-olefin elastomer, natural rubber, synthetic polyisoprene, butyl rubber, halogenated butyl rubbers, polybutadiene, styrene-butadiene rubber, styrenic block copolymers, nitrite rubber, hydrogenated nitrite rubbers, chloroprene rubber, polychloroprene, neoprene, ethylene-propylene rubber, ethylene-propylene-diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, ethylene-α-olefin random and block copolymers, thermoplastic elastomers, thermoplastic vulcanizates, thermoplastic polyurethane, thermoplastic olefins, polysulfide rubber, and blends of any two or more of these elastomers.

9. The constrained biaxially elastic nonwoven laminate of any one of the previously numbered embodiments, wherein the meltspun elastic fabric comprises a polyolefin-based elastomer having an MFR of less than 80 dg/min. Preferably, the elastomer is reactor grade.

10. The constrained biaxially elastic nonwoven laminate of any one of the previously numbered embodiments, wherein the meltspun elastic fabric comprises a propylene-α-olefin elastomer having and an MFR of less than 80 dg/min, a $H_f$ of less than 80 J/g, and comonomer-derived content within the range from 5 to 35 wt %, by weight of the propylene-α-olefin elastomer.

11. The constrained biaxially elastic nonwoven laminate of any one of the previously numbered embodiments, wherein the extensible fabric layer(s) comprise a material selected from the group consisting of polypropylene, polyethylene, functionalized polyolefins, plastomers (ethylene-α-olefin random copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics, elastomers, poly(acetylene), poly(thiophene), poly(aniline), poly(fluorene), poly(pyrrole), poly(3-alkythiophene), poly(phenylene sulfide), polynaphthalenes, poly(phenylene vinylene), poly(vinylidene fluoride), ethylene-α-olefin block copolymers, wood, viscose, cotton, and blends of any two or more of these materials.

12. The constrained biaxially elastic nonwoven laminate of any one of the previously numbered embodiments, further characterized in that the at least one elastic fabric layer, designated "E", is combined with one or more extensible layers of fabric or film to form the laminate, the laminate being selected from structures consisting of ME, MEM, EE, EEE, EEEE, EEM, MMEMM, MMEM, EME, EMME, EEMEE, EMMEE, EMEEE, EEMMEE, EMEME, EEEMEE, SE, SES, SEM, SEES, SEEES, SSESS, SSES, SSEES, SSEEES, EE, EEE, EEEE, DEEEE, MEEEE, SEEEE, EES, ESE, ESSE, EESEE, ESSEE, ESEEE, EESSEE, ESESE, EESEE, DE, DDE, DED, DEE, DDDDE, EED, EDE, EDDE, EEDEE, EDDEE, EEDDEE, DME, DDMEE, EDMDE, DEMED, DDEMED, DDEMEDD, DDEMMEDD, DEMMED, EDMDMD, EMDME, EDMMDD, EEDMDEE, DDDDME, EEDMMDEE, FE, MEF, FEE, FEF, SEF, DEF, WEF, FEEE, FEEEE, FEEF, FEFEF, FEEM, EFE, EMFE, EEFEE, EFFEE, EMFEE, EEMFEE, EFD, EDFD, EDDFFD, EDFDD, DEF, DFE, DDDFE, FDE, EDDF, EFDEE, FEDDEE, EFDDEE, DMEF, DFMEE, EDFDE, DEFED, DDEFED, DDEFEDD, DDEFFEDD, DEFFED, EFDFD, EFDFE, SFME, SSFME, EFFE, TxE, TxSD, TxSW, TxMTx, TxSMSTx, TxETx, TxTxETxTx, ETxE, WE, WEW, EWE, EA, EAE, AEA, TxEETx, TxSESTx, DTxETxD, WTxETxD. WSESW, DSESD, ETxTxE, ETxETxE, WTxETxW, WWEWW, WEEW, WSESW, WEAAEW, SEAAES, EATx, EAW, SEAWES, DEAED, SWEWS, wherein "M" represents meltblown fabric layers, "S" represents spunbond fabric layers, "F" represents film layers, "D" represents dry-laid (carded, air-laid) fabric layers, "Tx" represents textile-type of fabrics, "W" represents woven fabrics, and "A" represents absorbent (pulp, paper, superabsorbent materials, etc) fabrics. One or more of the "E" layers in a given structure may be an in situ laminate.

13. The constrained biaxially elastic nonwoven laminate of any one of the previously numbered embodiments, wherein the biaxially elastic nonwoven laminate comprises two or more facing fabric layers comprising a blend of any two or more types of fibers comprising polypropylene, polyethylene terephthalate, viscose, cotton, and an elastic fabric there between comprising a propylene-α-Olefin elastomer.

14. The constrained biaxially elastic nonwoven laminate of any one of the previously numbered embodiments, wherein the biaxially elastic nonwoven laminate comprises two or more facing fabric layers comprising polypropylene, polyethylene terephthalate, or a blend of both, and an elastic fabric there between comprising a propylene-α-olefin elastomer.

15. The constrained biaxially elastic nonwoven laminate of any one of the previously numbered embodiments, further comprising at least three inelastic zones along the width and parallel to the MD of the biaxially elastic nonwoven laminate such as to impart CD elasticity in the laminate, wherein two of the inelastic zones run along the edge of the laminate and one inelastic zone runs down the middle of the laminate.

16. The constrained biaxially elastic nonwoven laminate of any one of the previously numbered embodiments, comprising forming at least the meltspun elastic fabric by extruding one or more propylene-α-olefin elastomer(s) alone or in a blend with another polymer, the propylene-α-olefin elastomer(s) having a MFR from less than 80 dg/min through at least one die having a plurality of nozzles to form a plurality of continuous fibers, at least one die operating at a melt pressure from greater than 500 psi (3.45 MPa) to form at least one elastic fabric.

17. An absorbent or barrier product comprising the constrained biaxially elastic nonwoven laminate of any one of the previously numbered embodiments, the articles selected from personal care products, baby diapers, training pants, absorbent underpads, swim wear, wipes, feminine hygiene products, bandages, wound care products, medical garments, surgical gowns, filters, adult incontinence products, surgical drapes, coverings, garments, protective apparel, clothing apparel, or cleaning articles and apparatus.

18. A method of imparting constraint in a biaxially elastic nonwoven laminate of any one of the previously numbered embodiments comprising providing a biaxially elastic nonwoven laminate comprising at least one meltspun elastic fabric and at least one extensible fabric or film; and fusing at least a portion of the at least one meltspun elastic fabric to at least one of the extensible fabrics to create at least one inelastic zone.

19. The method of numbered embodiment 18, wherein the fusing of discrete zones of the at least one meltspun elastic fabric to at least one of the extensible fabrics creates one or more zones that possess an elasticity that is at least 40% less elastic relative to the initial elasticity of the meltspun elastic fabric.

20. The method of numbered embodiments 18 and 19, wherein the fusing step is carried out by means of a calender with raised heated zoning patterns.

21. The method of numbered any one of embodiments 18-20, wherein fusing is affected using an ultrasonic unit.

22. The method of numbered any one of embodiments 18-21, wherein the fusing further introduces an embossed pattern in the laminate.

23. The method of any one of numbered embodiments 18-22, wherein the fusing and embossing step is carried out by means of a calender with male and female rolls that are optionally heated.

24. The method of any one of numbered embodiments 18-23, wherein the fusing and embossing step is carried out by means of patterned male and female vacuum drums running under a vacuum differential.

25. The method of numbered embodiment 5, wherein the in situ laminate is formed by a method comprising simultaneously meltspinning two or more polymer melts adjacent to one another to form adjacent fabrics, wherein fabric layers that are adjacent to one another are in situ entangled with one another to form an interfacial region of mixed fibers between the fabric layers.

26. The method of any one of numbered embodiments 18-25, wherein the application of adhesives is absent from the fusing step.

27. The method of any one of numbered embodiments 18-26, wherein adhesives are not used to adhere any two or more fabric and/or film layers to one another.

What is claimed is:

1. A method of imparting constraint in a biaxially elastic nonwoven laminate comprising:
    providing a biaxially elastic nonwoven laminate comprising at least one meltspun elastic fabric and at least one extensible fabric or film; and
    fusing at least a portion of the at least one meltspun elastic fabric to at least one of the extensible fabrics to create at least one inelastic zone;
    wherein the laminate has a CD width, and the at least one inelastic zone runs perpendicular to the CD of the laminate such that the inelastic zone has MD length longer than CD width of the inelastic zone, and where the CD width of the inelastic zone is at least 5% of the CD width of the laminate; and
    wherein the meltspun elastic fabric comprises 70 to 100 wt % of a propylene-based elastomer, based on the weight of the meltspun elastic fabric, where the propylene-based elastomer comprises propylene-derived units and 5 to 35 wt % ethylene-derived units, based on the weight of the propylene-based elastomer, and where the propylene-based elastomer has a heat of fusion of from 0.5 to 80 J/g and a MFR of from 1 to 50 dg/min.

2. The method of claim 1, wherein at least one portion of the bound fabric layers are fused in discrete zones that are parallel to the CD of the biaxially elastic laminate, parallel to the MD of the biaxially elastic laminate, or at some orientation there between.

3. The method of claim 1, wherein the fusing comprises calendaring the biaxially elastic nonwoven laminate to melt at least a portion of the meltspun elastic fabric and create a fusion to at least one extensible fabric.

4. The method of claim 1, wherein the fusing step is carried out by means of a calender with raised heated zoning patterns.

5. The method of claim 1, wherein the fusing further introduces an embossed pattern in the laminate.

6. The method of claim 1, wherein the biaxially elastic nonwoven laminate is an in situ laminate.

7. The method of claim 1, wherein the application of adhesives is absent from the fusing step.

8. The method of claim 1, wherein the propylene-based elastomer has an MFR of from 1 to 40 dg/min.

9. The method of claim 1, wherein the fusing creates at least three inelastic zones along the CD width and parallel to the MD of the biaxially elastic nonwoven laminate such as to impart CD elasticity in the laminate, wherein two of the inelastic zones run along the edge of the laminate and one inelastic zone runs down the middle of the laminate.

10. The method of claim 1, comprising forming at least the meltspun elastic fabric by extruding propylene-based elastomer alone or in a blend with another polymer, through at least one die having a plurality of nozzles to form a plurality of continuous fibers, at least one die operating at a melt pressure of greater than 500 psi (3.45 MPa) to form at least one elastic fabric.

11. An absorbent or barrier product comprising a constrained elastic nonwoven laminate made by a method comprising: providing a biaxially elastic nonwoven laminate comprising at least one meltspun elastic fabric and at least one extensible fabric or film; and fusing at least a portion of the at least one meltspun elastic fabric to at least one of the extensible fabrics to create at least one inelastic zone; wherein the laminate has a CD width, and the at least one inelastic zone runs perpendicular to the CD of the laminate such that the inelastic zone has MD length longer than CD width of the inelastic zone, and where the CD width of the inelastic zone is at least 5% of the CD width of the laminate; and wherein the meltspun elastic fabric comprises 70 to 100 wt % of a propylene-based elastomer, based on the weight of the meltspun elastic fabric, where the propylene-based elastomer comprises propylene-derived units and 5 to 35 wt % ethylene-derived units, based on the weight of the propylene-based elastomer, and where the propylene-based elastomer has a heat of fusion of from 0.5 to 80 J/g and a MFR of from 11 to 50 dg/min, wherein the product is selected from personal care products, baby diapers, training pants, absorbent underpads, swim wear, wipes, feminine hygiene products, bandages, wound care products, medical garments, surgical gowns, filters, adult incontinence products, surgical drapes, coverings, garments, protective apparel, clothing apparel, or cleaning articles and apparatus, and wherein the at least one inelastic zone remains in the absorbent or barrier product.

12. A method of imparting constraint in a biaxially elastic nonwoven laminate comprising:
    providing a biaxially elastic nonwoven laminate comprising at least one meltspun elastic fabric and at least one extensible fabric or film; and
    fusing one or more discrete zones of the at least one meltspun elastic fabric to at least one of the extensible fabrics to create zones that possess an elasticity that is at least 40% less elastic relative to the initial elasticity of the meltspun elastic fabric;
    wherein the meltspun elastic fabric comprises 70 to 100 wt % of a propylene-based elastomer, based on the weight of the meltspun elastic fabric, where the propylene-based elastomer comprises propylene-derived units and 5 to 35 wt % ethylene-derived units, based on the weight of the propylene-based elastomer, and where the propylene-based elastomer has a heat of fusion of from 0.5 to 80 J/g and a MFR of from 1 to 50 dg/min, wherein at least one of the zones runs along the CD width and parallel to the MD of the biaxially elastic nonwoven laminate, such that the at least one zone has MD length greater than CD width of the zone, and the CD width of the zone is at least 5% of the CD width of the laminate.

* * * * *